(12) United States Patent
Suzuki et al.

(10) Patent No.: US 9,742,537 B2
(45) Date of Patent: Aug. 22, 2017

(54) TERMINAL DEVICE, BASE STATION DEVICE, INTEGRATED CIRCUIT, AND WIRELESS COMMUNICATION METHOD

(71) Applicant: Sharp Kabushiki Kaisha, Osaka-shi, Osaka (JP)

(72) Inventors: Shoichi Suzuki, Osaka (JP); Tatsushi Aiba, Osaka (JP); Toshizo Nogami, Osaka (JP); Kazunari Yokomakura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 33 days.

(21) Appl. No.: 14/898,538

(22) PCT Filed: Jun. 16, 2014

(86) PCT No.: PCT/JP2014/065885
§ 371 (c)(1),
(2) Date: Dec. 15, 2015

(87) PCT Pub. No.: WO2014/203851
PCT Pub. Date: Dec. 24, 2014

(65) Prior Publication Data
US 2016/0142188 A1 May 19, 2016

(30) Foreign Application Priority Data

Jun. 18, 2013 (JP) .................................. 2013-127101

(51) Int. Cl.
*H04L 5/00* (2006.01)
*H04W 24/10* (2009.01)
(Continued)

(52) U.S. Cl.
CPC .......... *H04L 5/0048* (2013.01); *H04L 5/0057* (2013.01); *H04L 5/0092* (2013.01);
(Continued)

(58) Field of Classification Search
None
See application file for complete search history.

(56) References Cited

U.S. PATENT DOCUMENTS

| 2011/0135020 | A1* | 6/2011 | Au-Yeung | H04B 7/0617 375/260 |
|---|---|---|---|---|
| 2012/0082049 | A1* | 4/2012 | Chen | H04W 24/10 370/252 |

(Continued)

OTHER PUBLICATIONS

Ericsson et al., "On standardization impact of TDD UL-DL adaptation", 3GPP TSG-RAN WG1 #69, R1-122016, May 21-25, 2012, pp. 1-3.

(Continued)

*Primary Examiner* — Chi H Pham
*Assistant Examiner* — Soon-Dong D Hyun
(74) *Attorney, Agent, or Firm* — Keating & Bennett, LLP

(57) ABSTRACT

A subframe in a certain cell that satisfies criteria which includes at least a criterion (i) is regarded as being valid as a CSI reference resource. In a case where, in the criterion (i), information which is signaled on a PDCCH and that indicates an UL-DL configuration for a cell is detected, the UL-DL configuration for the cell is given by the information. In a case where, in the criterion (i), the information is not detected, the UL-DL configuration for the cell is same as an UL-DL configuration that is indicated by a higher layer parameter. The criterion (i) stipulates that, in a case where multiple cells with different UL-DL configurations are aggregated and the terminal device is not capable of simultaneous reception and transmission in the multiple cells, a subframe in a primary cell is a DL subframe or a special subframe that is indicated by an UL-DL configuration for the primary cell.

12 Claims, 20 Drawing Sheets

(51) Int. Cl.
*H04W 72/04* (2009.01)
*H04L 5/14* (2006.01)

(52) U.S. Cl.
CPC ........... *H04L 5/1469* (2013.01); *H04W 24/10* (2013.01); *H04W 72/0446* (2013.01); *H04L 5/001* (2013.01); *H04L 5/0023* (2013.01)

(56) References Cited

U.S. PATENT DOCUMENTS

| | | | | |
|---|---|---|---|---|
| 2012/0195213 A1* | 8/2012 | Tan | ........................ | H04L 5/0053 370/252 |
| 2012/0320783 A1* | 12/2012 | Wu | ........................ | H04B 7/0689 370/252 |
| 2013/0310019 A1* | 11/2013 | Visotsky | ................ | H04B 7/024 455/422.1 |
| 2013/0343216 A1* | 12/2013 | Su | ........................ | H04W 24/10 370/252 |

OTHER PUBLICATIONS

Ericsson et al., "Signalling support for dynamic TDD", 3GPP TSG-RAN WG1 #72, R1-130558, Jan. 28-Feb. 1, 2013, 3 pages.

"3rd Generation Partnership Project; Technical Specification Group Radio Access Network; Evolved Universal Terrestrial Radio Access (E-UTRA); Physical layer procedures (Release 11)," 3GPP TS 36.213 V11.2.0, Feb. 2013, pp. 1-173.

ASUSTeK, "Correction of valid downlink subframe", 3GPP TSG-RAN1 Meeting #73, R1-132682, May 20-24, 2013, 6 pages.

ASUSTek, "CSI reference subframe for half duplex TDD UE", 3GPP TSG-RAN WG1 Meeting #72bis, R1-121041, Apr. 15-19, 2013, 3 pages.

Suzuki, S. et al.; "Terminal Device, Wireless Communication Method and Integrated Circuit"; U.S. Appl. No. 14/898,153, filed Dec. 14, 2015.

* cited by examiner

FIG. 9

| UPLINK-DOWNLINK CONFIGURATION | DOWNLINK-UPLINK SWITCH-POINT PERIOD | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

FIG. 12

| SET # | (PRIMARY CELL UL-DL CONFIGURATION, SECONDARY CELL UL-DL CONFIGURATION) | SECONDARY CELL SECOND UPLINK REFERENCE UL-DL CONFIGURATION |
|---|---|---|
| SET 1 | (1,1),(1,2),(1,4),(1,5) | 1 |
| | (2,2),(2,5) | 2 |
| | (3,3),(3,4),(3,5) | 3 |
| | (4,4),(4,5) | 4 |
| | (5,5) | 5 |
| SET 2 | (1,0),(2,0),(3,0),(4,0),(5,0),(6,0) | 0 |
| | (2,1),(4,1),(5,1) | 1 |
| | (5,2) | 2 |
| | (4,3),(5,3) | 3 |
| | (5,4) | 4 |
| | (1,6),(2,6),(3,6),(4,6),(5,6) | 6 |
| SET 3 | (3,1) | 1 |
| | (3,2),(4,2) | 2 |
| | (1,3),(2,3) | 3 |
| | (2,4) | 4 |
| SET 4 | (0,0),(6,0) | 0 |
| | (0,1),(0,2),(0,4),(0,5),(6,1),(6,2),(6,5) | 1 |
| | (0,3),(0,6) | 3 |
| | (6,4) | 4 |
| | (0,6),(6,6) | 6 |

FIG. 14

| SET # | (PRIMARY CELL UL-DL CONFIGURATION, SECONDARY CELL UL-DL CONFIGURATION) | SECONDARY CELL SECOND DOWNLINK REFERENCE UL-DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(02),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 15

| CONDITION | FIRST UPLINK REFERENCE UL-DL CONFIGURATION | FIRST DOWNLINK REFERENCE UL-DL CONFIGURATION |
|---|---|---|
| (a) | D | D |
| (b) | U | U or D |
| (c) | S | S or D |

FIG. 16

| CONDITION | FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|---|
| (d) | D | D | D |
| (e) | U | U | U |
| (f) | U | D | U or D |
| (g) | S | S | S |
| (h) | S | D | S or D |

FIG. 17

| FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|
| 0 | 0 | − (0) |
| 0 | 1 | 0, 1, 6 |
| 0 | 2 | 0, 1, 2, 6 |
| 0 | 3 | 0, 3, 6 |
| 0 | 4 | 0, 1, 3, 4, 6 |
| 0 | 5 | 0, 1, 2, 3, 4, 5, 6 |
| 0 | 6 | 0, 6 |
| 1 | 1 | − (1) |
| 1 | 2 | 1, 2 |
| 1 | 4 | 1, 4 |
| 1 | 5 | 1, 2, 4, 5 |
| 2 | 2 | − (2) |
| 2 | 5 | 2, 5 |
| 3 | 3 | − (3) |
| 3 | 4 | 3, 4 |
| 3 | 5 | 3, 4, 5 |
| 4 | 4 | − (4) |
| 4 | 5 | 4, 5 |
| 5 | 5 | − (5) |
| 6 | 6 | − (6) |
| 6 | 1 | 1, 6 |
| 6 | 2 | 1, 2, 6 |
| 6 | 3 | 3, 6 |
| 6 | 4 | 1, 3, 4, 6 |
| 6 | 5 | 1, 2, 3, 4, 5, 6 |

FIG. 18

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | 4 | | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 19

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

FIG. 20

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 21

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

| CQI INDEX | MODULATION | CODING RATE × 1024 | EFFICIENCY |
|---|---|---|---|
| 0 | OUT OF RANGE | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TERMINAL DEVICE, BASE STATION DEVICE, INTEGRATED CIRCUIT, AND WIRELESS COMMUNICATION METHOD

TECHNICAL FIELD

The present invention relates to a terminal device, a base station device, an integrated circuit, and a wireless communication method.

This application claims the benefit of Japanese Priority Patent Application No. 2013-127101 filed Jun. 18, 2013, the entire contents of which are incorporated herein by reference.

BACKGROUND ART

In the 3rd Generation Partnership Project (3GPP), a radio access method and a radio network for cellular mobile communication (hereinafter referred to as "Long Term Evolution (LTE)", or "Evolved Universal Terrestrial Radio Access (EUTRA)") have been considered. IN LTE, a base station device is also referred to as an evolved NodeB (eNodeB) and a mobile station device is referred to as user equipment (UE). LTE is a cellular communication system in which an area is divided in a cellular pattern into multiple cells, each being served by a base station device. A single base station device may manage multiple cells.

LTE supports Time Division Duplex (TDD). LTE that employs a TDD scheme is also referred to as TD-LTE or LTE TDD. TDD is a technology that enables full duplex communication in a single frequency band by performing time division multiplexing on an uplink signal and a downlink signal.

In the 3GPP, application of a traffic adaptation technology and an interference reduction technology (DL-UL interference management and traffic adaptation) to TD-LTE has been studied. The traffic adaptation technology is a technology that changes a ratio of an uplink resource to a downlink resource according to uplink traffic and downlink traffic. The traffic adaptation technology is also referred to as dynamic TDD.

In NPL 1, a method of using a flexible subframe is disclosed as a method of realizing traffic adaptation. The base station device can perform reception of the uplink signal or transmission of the downlink signal on the flexible subframe. In NPL 1, as long as the base station device does not instruct the mobile station device to transmit the uplink signal on the flexible subframe, the mobile station device regards the flexible subframe as the downlink subframe.

In NPL 1, it is disclosed that hybrid automatic repeat request (HARQ) timing for a PDSCH (physical downlink shared channel) is determined based on newly introduced uplink-downlink configuration, and the HARQ timing for a physical uplink shared channel (PUSCH) is determined based on the first UL-DL configuration.

In NPL 2, it is disclosed that (a) a UL/DL reference configuration is introduced and that (b) several subframes are scheduled, for either of uplink and downlink, by dynamic•grant/assignment from a scheduler.

In Section 7.2 in NPL 3, a procedure that is performed by the mobile station device for reporting of channel state information (CSI) is disclosed. The base station device allocates a downlink resource to the mobile station device, based on the channel state information that is reported from multiple mobile station devices. The channel state information includes a channel quality indicator (CQI).

CITATION LIST

Non Patent Document

[NON PATENT DOCUMENT 1] "On standardization impact of TDD UL-DL adaptation", R1-122016, Ericsson, ST-Ericsson, 3GPP TSG-RAN WG1 Meeting #69, Prague, Czech Republic, 21-25 May 2012.

[NON PATENT DOCUMENT 2] "Signalling support for dynamic TDD", R1-130558, Ericsson, ST-Ericsson, 3GPP TSG-RAN WG1 Meeting #72, St Julian's, Malta, 28 Jan.-1 Feb. 2013.

[NON PATENT DOCUMENT 3] "3GPP TS36.213 v11.2.0 (2013-February)", 15 Mar. February 2013.

DISCLOSURE OF THE INVENTION

Problems to be Solved by the Invention

However, in the wireless communication system described above, a technology relating to a channel state information has not been sufficiently studied.

An object of the present invention, which is made in view of the problem described above, is to provide a terminal device, a base station device, an integrated circuit, and a wireless communication method, in each of which communication can efficiently be performed in a wireless communication system in which channel station information is used.

Means for Solving the Problems (1) In order to accomplish the object described above, the present invention is contrived to provide the following means. That is, according to a first aspect of the present invention, there is provided a terminal device including: a measurement unit that, for a value of a channel quality indicator that is reported in a subframe n, derives an index of the channel quality indicator based on a channel state information reference resource; and a transmission unit that reports channel state information which comprises the channel quality indicator in the subframe n, in which in a time domain, the channel state information reference resource is defined by one subframe $n-n_{CQI\_ref}$ in which for periodic reporting of the channel state information, the $n_{CQI\_ref}$ is the smallest value that is equal to or greater than 4, such that the subframe $n-n_{CQI\_ref}$ corresponds to a valid subframe, in which a subframe in a certain serving cell that satisfies criteria which include at least a criteria (i) is considered to be valid, in which the criterion (i) stipulates that, in a case where multiple cells with different uplink-downlink configurations are aggregated and the terminal device is not capable of simultaneous reception and transmission in the aggregated multiple cells, a subframe in a primary cell is a downlink subframe or a special subframe that is indicated by an uplink-downlink configuration for a radio frame for the primary cell, in which, in the criterion (i), in a case where information which is signaled on a physical downlink control channel and that indicates an uplink-downlink configuration for the radio frame for the cell is detected, the uplink-downlink configuration for the radio frame for the cell is an uplink-downlink configuration that is indicated by the information that indicates the uplink-downlink configuration for the radio frame for the cell, in which, in the criterion (i), in a case where the information that indicates the uplink-downlink configuration for the radio frame for the cell is not detected, the uplink-downlink configuration for the radio frame for the cell is an uplink-downlink configuration that is indicated by a higher layer parameter, and in which, the aggregated multiple cells include the one primary cell.

(2) Furthermore, according to a second aspect of the present invention, in the above-described terminal device according to the first aspect, the special subframe in the criterion (i) may include a downlink pilot time slot (DwPTS) field of which length is more than a predefined value.

(3) Furthermore, according to a third aspect of the present invention, in the above-described terminal device according to the first or second aspect, the criteria may include a criterion (ii), a criterion (iii), a criterion (iv), a criterion (v), and a criterion (vi), the criterion (ii) may stipulate that, for the radio frame for the cell, the subframe is a subframe that is indicated, as the downlink subframe or the special subframe, by the uplink-downlink configuration for the radio frame for the cell, the criterion (iii) may stipulate that, for transmission modes 1 to 8, the subframe is not a multimedia broadcast and multicast service over single frequency network (MBSFN) subframe, the criterion (iv) may stipulate that, in a case where a length of a DwPTS is equal to or less than a predefined value, the subframe does not contain the downlink pilot time slot (DwPTS) field, the criterion (v) may stipulate that the subframe does not fall within a measurement gap that is configured for the terminal device, the criterion (vi) may stipulate that, for the periodic reporting of the channel state information, in a case where subframe sets relating to the channel state information are configured, the subframe is an element of a subframe set that is linked to the periodic reporting of the channel state information, in the criterion (ii), in the case where the information which is signaled on the physical downlink control channel and that indicates the uplink-downlink configuration for the radio frame for the cell is detected, the uplink-downlink configuration for the radio frame for the cell may be given by the information that indicates the uplink-downlink configuration for the radio frame for the cell, and in the criterion (ii), in a case where the information that indicates the uplink-downlink configuration for the radio frame for the cell is not detected, the uplink-downlink configuration for the radio frame for the cell may be same as an uplink-downlink configuration that is indicated by a higher layer parameter.

(4) Furthermore, according to a fourth aspect of the present invention, in the above-described terminal device according to the third aspect, in a case where the subframe sets relating to the channel state information are configured, the measurement unit may use an interference measurement resource that is configured within a subframe set that belongs to the channel state information reference resource, in order to derive interference measurement relating to the channel quality indicator that is reported in the subframe n.

(5) Furthermore, according to a fifth aspect of the present invention, there is provided a wireless communication method for use in a terminal device, the method including: deriving an index of the channel quality indicator based on a channel state information reference resource, for a value of a channel quality indicator that is reported in a subframe n; and reporting channel state information which comprises the channel quality indicator in the subframe n, in which in a time domain, the channel state information reference resource is defined by one subframe $n-n_{CQI\_ref}$ in which for periodic reporting of the channel state information, the $n_{CQI\_ref}$ is the smallest value that is equal to or greater than 4 such that the subframe $n-n_{CQI\_ref}$ corresponds to a valid subframe, in which a subframe in a certain serving cell that satisfies criteria which include at least a criteria (i) is considered to be valid, in which the criterion (i) stipulates that, in a case where multiple cells with different uplink-downlink configurations are aggregated and the terminal device is not capable of simultaneous reception and transmission in the aggregated multiple cells, a subframe in a primary cell is a downlink subframe or a special subframe that is indicated by an uplink-downlink configuration for a radio frame for the primary cell, in which, in the criterion (i), in a case where information which is signaled on a physical downlink control channel and that indicates an uplink-downlink configuration for the radio frame for the cell is detected, the uplink-downlink configuration for the radio frame for the cell is an uplink-downlink configuration that is indicated by the information that indicates the uplink-downlink configuration for the radio frame for the cell, in which, in the criterion (i), in a case where the information that indicates the uplink-downlink configuration for the radio frame for the cell is not detected, the uplink-downlink configuration for the radio frame for the cell is an uplink-downlink configuration that is indicated by a higher layer parameter, and in which, the aggregated multiple cells include the one primary cell.

(6) Furthermore, according to a sixth aspect of the present invention, in the above-described wireless communication method according to the fifth aspect, the special subframe in the criterion (i) may contain a downlink pilot time slot (DwPTS) field of which length is more than a predefined value.

(7) Furthermore, according to a seventh aspect of the present invention, in the above-described wireless communication method according to the fifth or sixth aspect, the criteria may include a criterion (ii), a criterion (iii), a criterion (iv), a criterion (v), and a criterion (vi), the criterion (ii) may stipulate that, for the radio frame for the cell, the subframe is a subframe that is indicated, as the downlink subframe or the special subframe, by the uplink-downlink configuration for the radio frame for the cell, the criterion (iii) may stipulate that, for transmission modes 1 to 8, the subframe is not a multimedia broadcast and multicast service over single frequency network (MBSFN) subframe, the criterion (iv) may stipulate that, in a case where a length of a DwPTS is equal to or less than a predefined value, the subframe does not contain the downlink pilot time slot (DwPTS) field, the criterion (v) may stipulate that the subframe does not fall within a measurement gap that is configured for the terminal device, the criterion (vi) may stipulate that, for the periodic reporting of the channel state information, in a case where subframe sets relating to the channel state information are configured, the subframe is an element of a subframe set that is linked to the periodic reporting of the channel state information, in the criterion (ii), in the case where the information which is signaled on the physical downlink control channel and that indicates the uplink-downlink configuration for the radio frame for the cell is detected, the uplink-downlink configuration for the radio frame for the cell may be given by the information that indicates the uplink-downlink configuration for the radio frame for the cell, and in the criterion (ii), in a case where the information that indicates the uplink-downlink configuration for the radio frame for the cell is not detected, the uplink-downlink configuration for the radio frame for the cell may be same as an uplink-downlink configuration that is indicated by a higher layer parameter.

(8) Furthermore, according to an eighth aspect of the present invention, in the above-described wireless communication method according to the seventh aspect, in a case where the subframe sets relating to the channel state information are configured, an interference measurement resource that is configured within a subframe set that belongs to the channel state information reference resource may be used in order to derive interference measurement relating to the channel quality indicator that is reported in the subframe n.

(9) Furthermore, according a sixth aspect of the present invention, there is provided an integrated circuit, which is built into a terminal device, and which causes the terminal device to perform a sequence of functions including: a function of deriving an index of the channel quality indicator based on a channel state information reference resource, for a value of a channel quality indicator that is reported in a subframe n; and a function of reporting channel state information which comprises the channel quality indicator in the subframe n, in which in a time domain, the channel state information reference resource is defined by one subframe $n-n_{CQI\_ref}$, in which for periodic reporting of the channel state information, the $n_{CQI\_ref}$ is the smallest value that is equal to or greater than 4, such that the subframe $n-n_{CQI\_ref}$ corresponds to a valid subframe, in which a subframe in a certain serving cell that satisfies criteria which include at least a criterion (i) is considered to be valid, in which the criterion (i) stipulates that, in a case where multiple cells with different uplink-downlink configurations are aggregated and the terminal device is not capable of simultaneous reception and transmission in the aggregated multiple cells, a subframe in a primary cell is a downlink subframe or a special subframe that is indicated by an uplink-downlink configuration for a radio frame for the primary cell, in which, in the criterion (i), in a case where information which is signaled on a physical downlink control channel and that indicates an uplink-downlink configuration for the radio frame for the cell is detected, the uplink-downlink configuration for the radio frame for the cell is an uplink-downlink configuration that is indicated by the information that indicates the uplink-downlink configuration for the radio frame for the cell, in which, in the criterion (i), in a case where the information that indicates the uplink-downlink configuration for the radio frame for the cell is not detected, the uplink-downlink configuration for the radio frame for the cell is an uplink-downlink configuration that is indicated by a higher layer parameter, and in which, the aggregated multiple cells include the one primary cell.

(10) Furthermore, according to a tenth of the present invention, in the integrated circuit according to the ninth aspect, the special subframe in the criterion (i) may contain a downlink pilot time slot (DwPTS) field of which length is more than a predefined value.

(11) Furthermore, according to an eleventh aspect of the present invention, in the above-described integrated circuit according to the ninth or tenth aspect, the criteria may include a criterion (ii), a criterion (iii), a criterion (iv), a criterion (v), and a criterion (vi), the criterion (ii) may stipulate that, for the radio frame for the cell, the subframe is a subframe that is indicated, as the downlink subframe or the special subframe, by the uplink-downlink configuration for the radio frame for the cell, the criterion (iii) may stipulate that, for transmission modes 1 to 8, the subframe is not a multimedia broadcast and multicast service over single frequency network (MBSFN) subframe, the criterion (iv) may stipulate that, in a case where a length of a DwPTS is equal to or less than a predefined value, the subframe does not contain the downlink pilot time slot (DwPTS) field, the criterion (v) may stipulate that the subframe does not fall within a measurement gap that is configured for the terminal device, the criterion (vi) may stipulate that, for the periodic reporting of the channel state information, in a case where subframe sets relating to the channel state information are configured, the subframe is an element of a subframe set that is linked to the periodic reporting of the channel state information, in the criterion (ii), in the case where the information which is signaled on the physical downlink control channel and that indicates the uplink-downlink configuration for the radio frame for the cell is detected, the uplink-downlink configuration for the radio frame for the cell may be given by the information that indicates the uplink-downlink configuration for the radio frame for the cell, and in the criterion (ii), in a case where the information that indicates the uplink-downlink configuration for the radio frame for the cell is not detected, the uplink-downlink configuration for the radio frame for the cell may be same as an uplink-downlink configuration that is indicated by a higher layer parameter.

(12) Furthermore, according to a twelfth aspect of the present invention, in the above-described integrated circuit according to the eleventh aspect, in a case where the subframe sets relating to the channel state information are configured, an interference measurement resource that is configured within a subframe set that belongs to the channel state information reference resource may be used in order to derive interference measurement relating to the channel quality indicator that is reported in the subframe n.

Effects of the Invention

According to the present invention, in a wireless communication system in which channel state information is used, a mobile station device and a base station device can efficiently communicates with each other.

BRIEF DESCRIPTION OF THE DRAWINGS

FIG. 9 is a diagram illustrating one example of an uplink-downlink configuration according to the present embodiment.

FIG. 12 is a diagram illustrating a correspondence between a pair that is formed by the first uplink reference UL-DL configuration for a different serving cell (a primary cell) and the first uplink reference UL-DL configuration for a serving cell (a secondary cell), and a second uplink reference UL-DL configuration for the secondary cell, according to the present embodiment.

FIG. 14 is a diagram illustrating a correspondence between a pair that is formed by the first downlink reference UL-DL configuration for the primary cell and the first downlink reference UL-DL configuration for the secondary cell, and the second downlink reference UL-DL configuration for the secondary cell, according to the present embodiment.

FIG. 15 is a diagram illustrating a relationship between a subframe that is indicated by the first uplink reference UL-DL configuration and a subframe that is indicated by the first downlink reference UL-DL configuration, according to the present embodiment.

FIG. 16 is a diagram illustrating a relationship among the subframe that is indicated by the first uplink reference UL-DL configuration, the subframe that is indicated by the first downlink reference UL-DL configuration, and a subframe that is indicated by a transmission direction UL-DL configuration, according to the present embodiment.

FIG. 17 is a diagram illustrating a relationship among the first uplink reference UL-DL configuration, the first downlink reference UL-DL configuration, and the transmission direction UL-DL configuration, according to the present embodiment.

FIG. 18 is a diagram illustrating a correspondence between a subframe n to which a PDCCH/EPDCCH/PHICH is allocated and a subframe n+k to which the PUSCH to which the PDCCH/EPDCCH/PHICH corresponds is allocated, according to the present embodiment.

FIG. 19 is a diagram illustrating the correspondence between the subframe n to which the PHICH is allocated, and a subframe n−k to which the PUSCH to which the PHICH corresponds is allocated, according to the present embodiment.

FIG. 20 is a diagram illustrating a correspondence between the subframe n to which the PUSCH is allocated, and the subframe n+k to which the PHICH that the PUSCH corresponds to is allocated, according to the present embodiment. The mobile station device 1 specifies (selects or determines) a value k in accordance with a table in FIG. 20.

FIG. 21 is a diagram illustrating a correspondence between a subframe n−k to which the PDSCH is allocated and the subframe n to which a HARQ-ACK that corresponds to the PDSCH is transmitted, according to the present embodiment.

MODE FOR CARRYING OUT THE INVENTION

First Embodiment

Figure 1:
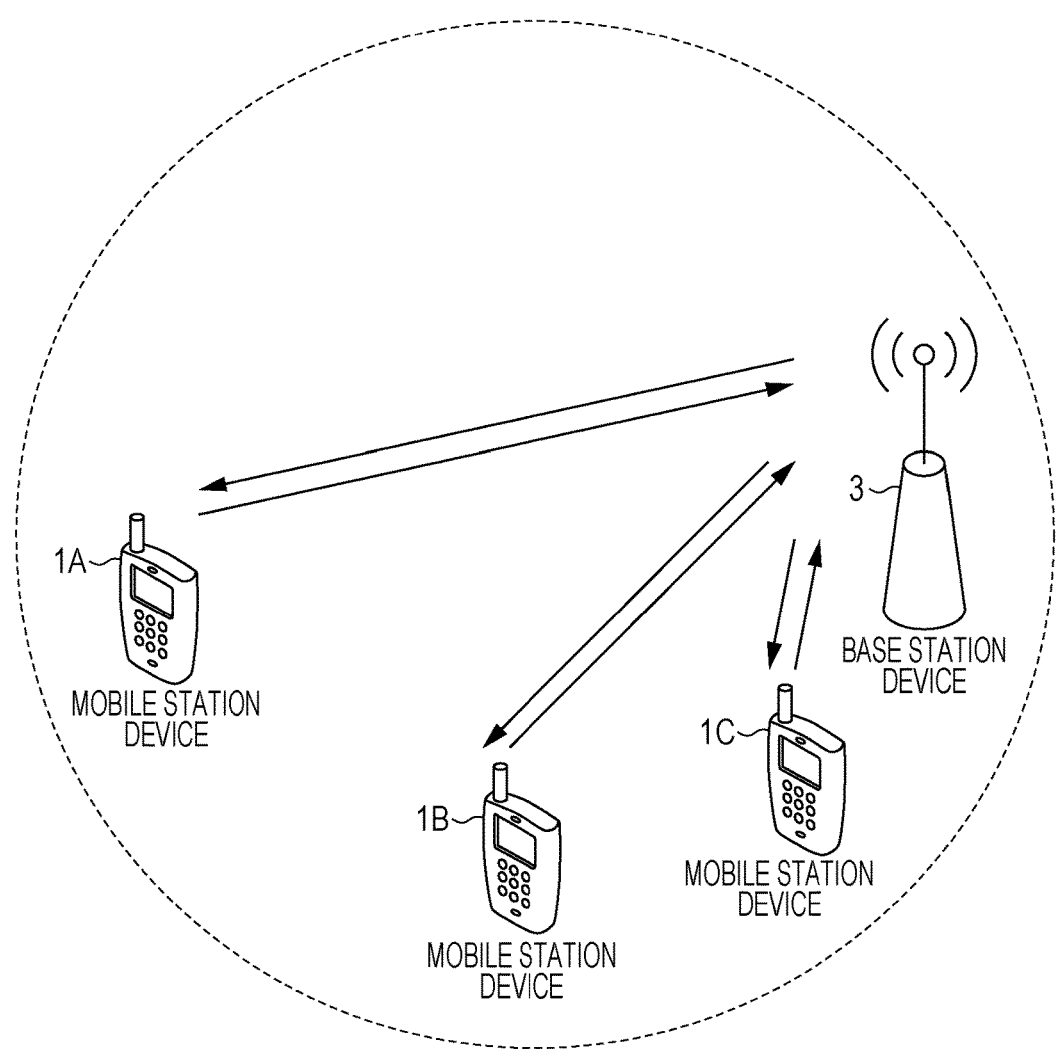
FIG. 1 is a conceptual diagram of a wireless communication system according to the present embodiment.

Embodiments of the present invention will be described below.

According to the present embodiment, multiple cells are set for a mobile station device. A technology in which a mobile station device performs communication with the multiple cells is referred to as a cell aggregation or a carrier aggregation. The present invention may be applied to each of the multiple cells that are set for the mobile station device. Furthermore, the present invention may be applied to some of the multiple cells that are set. A cell that is set for the mobile station device is also referred to as a serving cell.

Multiple serving cells that are set include one primary cell or one or multiple secondary cells. The primary cell is a serving cell in which an initial connection establishment procedure is performed, a serving cell in which a connection re-establishment procedure is started, or a cell that is indicated as a primary cell during a handover procedure. At a point of time when an RRC connection is established, or later, a secondary cell may be set.

A Time Division Duplex (TDD) scheme is applied to a wireless communication system according to the present embodiment. In a case of the cell aggregation, the TDD scheme may be applied to all multiple cells. Furthermore, in the case of the cell aggregation, a cell to which the TDD scheme is applied and a cell to which a Frequency Division Duplex (FDD) scheme is applied may be aggregated. In a case where the cell to which the TDD is applied and the cell to which the FDD is applied are aggregated, the present invention can be applied to the cell to which the TDD is applied.

In a case where multiple cells to each of which the TDD is applied are aggregated, a half-duplex TDD scheme or a full-duplex TDD scheme is applied.

In a case of the half-duplex TDD, uplink transmission and downlink reception cannot be performed at the same time in the multiple cells to each of which the TDD is applied. In the case of the half-duplex TDD, the mobile station device does not perform transmission and reception at the same time in one primary cell in a certain band or in one primary cell and one or multiple secondary cells in multiple different bands.

In a case of the full-duplex TDD, the uplink transmission and the downlink reception can be performed at the same time in the multiple cells to each of which the TDD is applied. In the case of the full-duplex TDD, the mobile station device can perform the transmission and the reception at the same time in multiple serving cells in multiple different bands.

The mobile station device transmits information showing a combination of bands in which the carrier aggregation is supported by the mobile station device, to the base station device. For each of the combinations of bands, the mobile station device transmits information indicating whether or not the transmission and the reception are supported at the same time in the multiple serving cells in the multiple different bands, to the base station device.

According to the present embodiment, "X/Y" includes the meaning of "X or Y". According to the present embodiment, "X/Y" includes the meaning of "X and Y". According to the present embodiment, "X/Y" includes the meaning of "X and/or Y".

FIG. 1 is a conceptual diagram of the wireless communication system according to the present embodiment. In FIG. 1, the wireless communication system includes mobile station devices 1A to 1C and a base station device 3. The mobile station devices 1A to 1C each are hereinafter referred to as a mobile station device 1.

A physical channel and a physical signal according to the present embodiment are described.

In FIG. 1, in uplink wireless communication from the mobile station device 1 to the base station device 3, the following uplink physical channels are used. The uplink physical channel is used to transmit information that is output from a higher layer.

Physical uplink control channel (PUCCH)
Physical uplink shared channel (PUSCH)
Physical random access channel (PRACH)

The PUCCH is a physical channel that is used to transmit uplink control information (UCI) The pieces of uplink control information include downlink channel state information (CSI), a scheduling request (SR) showing a request for a PUSCH resource, and an acknowledgement (ACK)/negative-acknowledgement (NACK) of downlink data (a transport block or a downlink-shared channel (DL-SCH). The ACK/NACK is also referred to as a HARQ-ACK or HARQ feedback, or response information.

The PUSCH is a physical channel that is used to transmit uplink data (uplink-shared channel (UL-SCH)). Furthermore, the PUSCH may be used to the HARQ-ACK and/or channel state information along with the uplink data. Furthermore, the PUSCH may be used to transmit only the channel state information or to transmit only the HARQ-ACK and the channel state information.

The PRACH is a physical channel that is used to transmit to a random access preamble. A main object of the PRACH is to synchronize the mobile station device 1 to the base station device 3 in terms of a time domain. In addition, the PRACH is also used to show the initial connection establishment procedure, the handover procedure, the connection re-establishment procedure, synchronization (timing adjustment) for uplink transmission, and the request for the PUSCH resource.

In FIG. 1, the following uplink physical signals are used for the uplink wireless communication. The uplink physical signal is not used to transmit information that is output from the higher layer, but is used by a physical layer.

Uplink reference signal (UL RS)

According to the present embodiment, the following 2 uplink reference signals are used.

Demodulation reference signal (DMRS)
Sounding reference signal (SRS)

The DMRS relates to transmission of the PUSCH or the PUCCH. The DMRS is time-multiplexed along with the PUSCH or the PUCCH. The base station device 3 uses the DMRS in order to perform channel reconfiguration of the PUSCH or the PUCCH. Transmission of both of the PUSCH and the DMRS is hereinafter referred to simply as transmission of the PUSCH. Transmission of both of the PUCCH and the DMRS is hereinafter referred to as transmission of the PUCCH.

The SRS has no relationship with the transmission of the PUSCH or the PUCCH. The base station device 3 uses the SRS in order to measure an uplink channel state. The mobile station device 1 transmits a first SRS in a first resource that is set by the higher layer. Additionally, in a case where information showing a request for transmission of the SRS is received through the PDCCH, the mobile station device 1 transmits a second SRS only one time in a second resource that is set by the higher layer. The first SRS is also referred to as a periodic SRS or a type 0 trigger SRS. The second SRS is also referred to as an aperiodic SRS or a type 1 trigger SRS. Transmission of the aperiodic SRS is scheduled by the information showing that the transmission of the SRS is requested.

In FIG. 1, the following downlink physical channels are used for downlink wireless communication from the base station device 3 to the mobile station device 1. The downlink physical channel is used to transmit the information that is output from the higher layer.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)
Physical multicast channel (PMCH)

The PBCH is used to broadcast a master information block (MIB) (or a broadcast channel (BCH)) that is in common use in the mobile station device 1. The MIB is transmitted at intervals of 40 ms, and the MIB is repeatedly transmitted with a period of 10 ms. Specifically, initial transmission is performed in subframe 0 in a radio frame that satisfies SFN mod 4=0, and re-transmission (repetition) of the MIB is performed in subframe 0 in the other radio frames. A system frame number (SFN) is a radio frame number. The MIB is system information. For example, the MIB includes information showing the SFN.

The PCFICH is used to transmit information that indicates a region (an OFDM symbol) which is used for transmission of the PDCCH.

The PHICH is used to transmit a HARQ indicator (the HARQ feedback or the response information) that shows an acknowledgement (ACK) of or a negative acknowledgement (NACK) of the uplink data (uplink shared channel (UL-SCH)) which is received by the base station device 3. For example, in a case where the mobile station device 1 receives the HARQ indicator indicating the ACK, corresponding uplink data is not re-transmitted. For example, in a case where the mobile station device 1 receives the HARQ indicator showing the NACK, the corresponding uplink data is re-transmitted. The HARQ indicator for a single piece of uplink data is transmitted on a single PHICH. The base station device 3 transmits HARQ indicators for multiple pieces of uplink data that are included in the same PUSCH, using multiple PHICH, respectively.

The PDCCH and the EPDCCH are used to transmit downlink control information (DCI). The downlink control information is also referred to as a DCI format. The downlink control information includes a downlink grant and an uplink grant. The downlink grant is also referred to as downlink assignment or downlink allocation.

The downlink grant is used for scheduling of the PDSCH within a single cell. The downlink grant is used for the scheduling of the PDSCH within in the same subframe as the subframe on which the downlink grant is transmitted. The uplink grant is used for scheduling of the PUSCH within a single cell. The uplink grant is used for the scheduling of a single PUSCH within the fourth or later subframe after the subframe on which the uplink grant is transmitted.

A cyclic redundancy check (CRC) parity bit is added to the DCI format. The CRC parity bit is scrambled with a cell-radio network temporary identifier (C-RNTI) or a semi persistent scheduling cell-radio network temporary identifier (SPS C-RNTI). The C-RNTI and the SPS C-RNTI are identifiers for identifying a mobile station device with a cell.

The C-RNTI is used to control the PDSCH or the PUSCH in a single subframe. The SPS C-RNTI is used to periodically allocate a resource for the PDSCH or the PUSCH.

The PDSCH is used for transmitting downlink data (downlink shared channel (DL-SCH)).

The PMCH is used to transmit a multicast channel (MCH).

In FIG. 1, in the downlink wireless communication, the following downlink physical signals are used. The downlink physical signal is not used to transmit the information that is output from the higher layer, but is used by the physical layer.

Synchronization Signal (SS)
Downlink Reference Signal (DL RS)

The synchronization signal is used in order for the mobile station device 1 to be synchronized in terms of frequency and time domains for downlink. In the TDD scheme, the synchronization signal is mapped to subframes 0, 1, 5, and 6 within a radio frame. In the FDD scheme, the synchronization signal is mapped to subframes 0 and 5 within the radio frame.

The downlink reference signal is used in order for the mobile station device 1 to perform the channel reconfiguration of the downlink physical channel. The downlink reference signal is used in order for the mobile station device 1 to calculate the downlink channel state information.

According to the present embodiment, the following five types of downlink reference signals are used.

Cell-specific reference signal (CRS)
UE-specific reference signal (URS) relating to the PDSCH
Demodulation reference signal (DMRS) relating to the EPDCCH
Non-zero power channel state information-reference signal (NZP CSI-RS)
Zero power channel state information-reference signal (ZP CSI-RS)
Multimedia broadcast and multicast service over single frequency network reference signal (MBSFN RS)
Positioning reference signal (PRS)

The CRS is transmitted in an entire band for a subframe. The CRS is used to perform demodulation of the PBCH/PDCCH/PHICH/PCFICH/PDSCH. The CRS may be used in order for the mobile station device 1 to calculate the downlink channel state information. The PBCH/PDCCH/PHICH/PCFICH is transmitted in an antenna port that is used for transmission of the CRS.

The URS relating to the PDSCH is transmitted on a subframe and in a band. The subframe and the band are used for transmission of the PDSCH to which the URS relates. The URS is used to perform demodulation of the PDSCH to which the URS relates.

The PDSCH is transmitted in an antenna port that is used for transmission of the CRS or the URS. A DCI format 1A is used for the scheduling of the PDSCH that is transmitted in the antenna port which is used for the transmission of the CRS. A DCI format 2D is used for the scheduling of the PDSCH that is transmitted in the antenna port which is used for the transmission of the URS.

The DMRS relating to the EPDCCH is transmitted on a subframe and in a band. The subframe and the band are used for transmission of the EPDCCH to which the DMRS relates. The DMRS is used to perform demodulation of the EPDCCH to which the DMRS relates. The EPDCCH is transmitted in an antenna port that is used for transmission of the DMRS.

The NZP CSI-RS is transmitted on a subframe that is set. A resource on which the NZP CSI-RS is transmitted is set by the base station device. The NZP CSI-RS is used in order for the mobile station device 1 to calculate the downlink channel state information. The mobile station device 1 performs signal measurement (channel measurement) using the NZP CSI-RS.

A resource for the ZP CSI-RS is set by the base station device 3. With zero output, the base station device 3 transmits the ZP CSI-RS. To be more precise, the base station device 3 does not transmit the ZP CSI-RS. The base station device 3 does not transmit the PDSCH and the EPDCCH in a resource that is set for the ZP CSI-RS. For example, in a certain cell, the mobile station device 1 can measure interference in a resource to which the NZP CSI-RS corresponds.

The MBSFN RS is transmitted in an entire band for a subframe that is used for transmission of the PMCH. The MBSFN RS is used to perform demodulation of the PMCH. The PMCH is transmitted in the antenna port that is used for transmission of the MBSFN RS.

The PRS is used in order for the mobile station device to measure a geographical location of the mobile station device itself.

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The BCH, the MCH, the UL-SCH, and the DL-SCH are transport channels. A channel that is used in a Medium Access Control (MAC) layer is referred to as a transport channel. A unit of the transport channel that is used in the MACK layer is also referred to as a transport block (TB) or a MAC protocol data unit (PDU). Control of a hybrid automatic repeat request (HARQ) is performed for every transport block in the MAC layer. The transport block is a unit of data that the MAC layer delivers to the physical layer. In the physical layer, the transport block is mapped to a codeword, and coding processing is performed.

A configuration of the radio frame according to the present embodiment will be described below.

Figure 2:
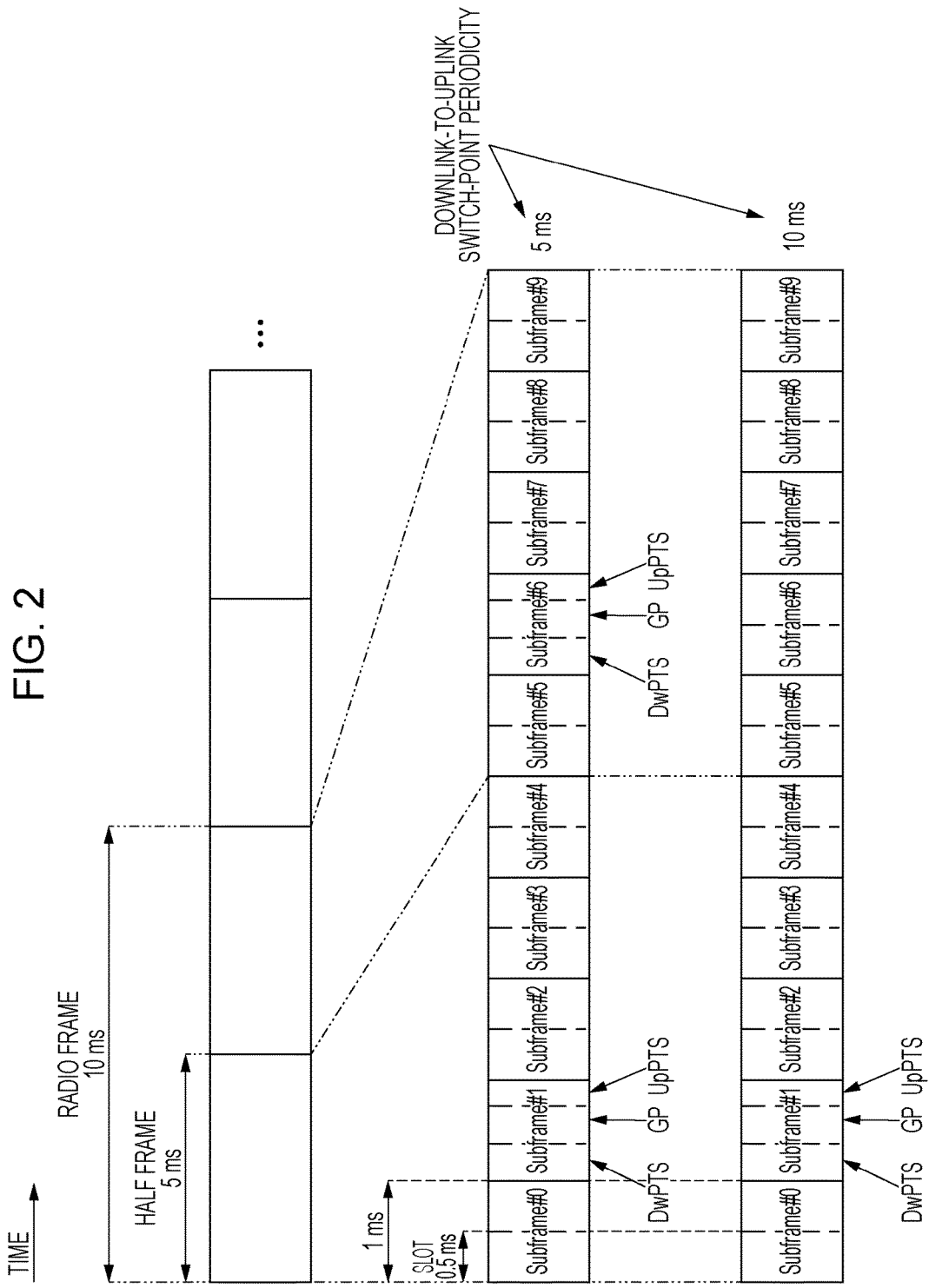
FIG. 2 is a diagram illustrating a schematic configuration of a radio frame according to the present embodiment.

FIG. 2 is a diagram illustrating a schematic configuration of the radio frame according to the present embodiment. Each of the radio frames is 10 ms in length. In FIG. 2, the horizontal axis is a time axis. Furthermore, radio frames each are configured from 2 half frames. Half frames each are 5 ms long. The half frames each are configured from 5 subframes. Subframes each are 1 ms long, and are defined by 2 consecutive slots. Slots each are 0.5 ms long. An i-th subframe within a radio frame is configured from a (2×i)-th slot and a (2×i+1)-th slot. To be more precise, 10 subframes can be used at intervals of 10 ms.

According to the present invention, the following 3 types of subframes are defined.

Downlink subframe (a first subframe)
Uplink subframe (a second subframe)
Special subframe (a third subframe)

The downlink subframe is a subframe reserved for downlink transmission. The uplink subframe is a subframe reserved for uplink transmission. The special subframe is configured from 3 fields. The 3 fields are a downlink pilot time slot (DwPTS), a guard period (GP), and an uplink pilot time slot (UpPTS). A sum of lengths of the DwPTS, the GP, and the UpPTS is 1 ms. The DwPTS is a slot reserved for the downlink transmission. The UpPTS is a slot reserved for the uplink transmission. The GP is a field in which the downlink transmission and the uplink transmission are not performed. Moreover, the special subframe may be configured only from the DwPTS and the GP, and may be configured only from the GP and the UpPTS.

A single radio frame is at least configured from the downlink subframe, the uplink subframe, and the special subframe.

The wireless communication system according to the present embodiment supports 5 ms downlink-to-uplink switch-point periodicity and 10 ms downlink-to-uplink switch-point periodicity. In a case where the downlink-to-uplink switch-point periodicity is 5 ms, the special subframe is included in both of the half frames within the radio frame. In a case where the downlink-to-uplink switch-point periodicity is 10 ms, the special subframe is included in an initial half frame within the radio frame.

A configuration of a slot according to the present embodiment will be described below.

Figure 3:
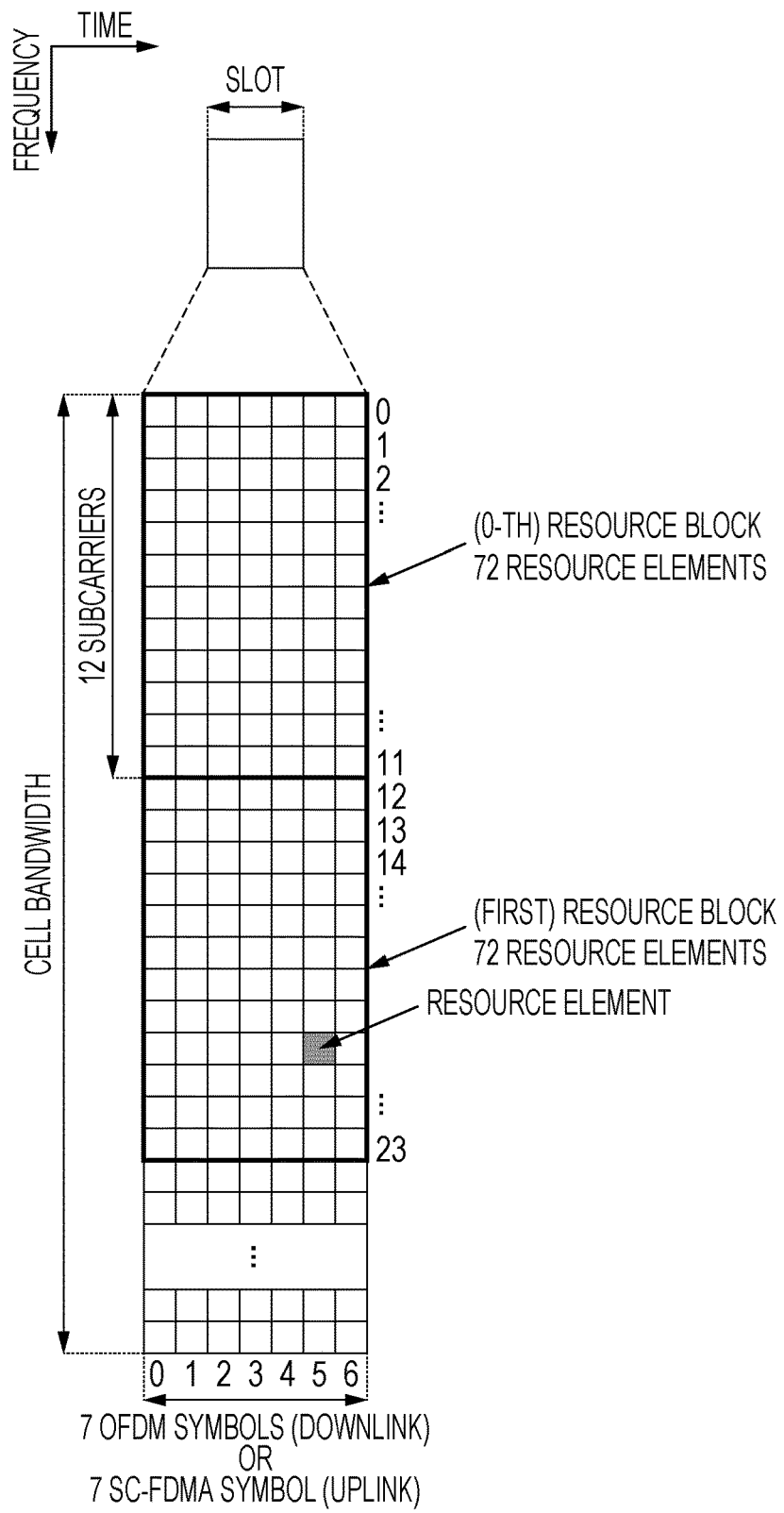
FIG. 3 is a diagram illustrating a configuration of a slot according to the present embodiment.

FIG. 3 is a diagram illustrating the configuration of the slot according to the present embodiment. According to the present embodiment, a normal cyclic prefix (CP) is applied to the OFDM symbol. Moreover, an extended cyclic prefix (CP) may be applied to the OFDM symbol. The physical signal or the physical channel that is transmitted to each of the slots are expressed by a resource grid. In FIG. 3, the horizontal axis is a time axis and the vertical axis is a frequency axis. In downlink, the resource grid is defined by multiple subcarriers and multiple OFDM symbols. In uplink, the resource grid is defined by multiple subcarriers and multiple SC-FDMA symbols. The number of subcarriers that constitute one slot depends on a cell bandwidth. The number of OFDM symbols or SC-FDMA symbols that constitute one slot is 7. Each of the elements within the resource grid is referred to as a resource element. The resource element is identified using a subcarrier number, and an OFDM symbol or SC-FDMA symbol number.

A resource block is used to express allocation of a certain physical channel (the PDSCH, the PUSCH, or the like) to resource elements. The resource block is defined by a virtual resource block and a physical resource block. A certain physical channel is first allocated to the virtual resource block. Thereafter, the virtual resource block is mapped to the physical resource block. One physical resource block is defined by 7 consecutive OFDM symbols or SC-FDMA symbols in a time domain and by 12 consecutive subcarriers in a frequency domain. Therefore, one physical resource block is configured from (7×12) resource elements. Furthermore, one physical resource block corresponds to one slot in the time domain, and corresponds to 180 kHz in the frequency domain. The physical resource blocks are numbered from 0 in the frequency domain.

The physical channel and the physical signal that are transmitted in each of the subframes will be described below.

Figure 4:
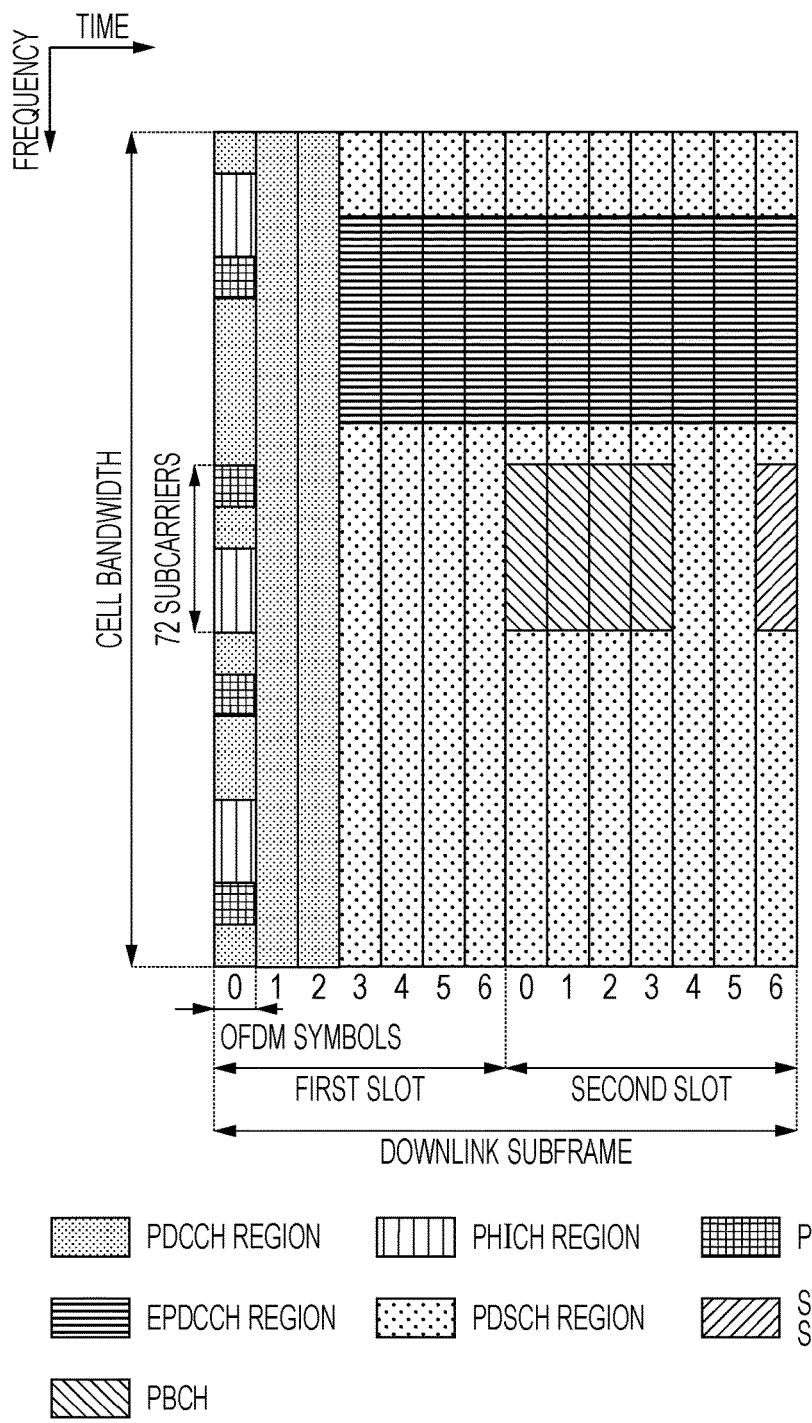
FIG. 4 is a diagram illustrating one example of allocation of a physical channel and mapping of a physical signal to a downlink subframe according to the present embodiment.

FIG. 4 is a diagram illustrating one example of allocation of the physical channel and mapping of the physical signal to the downlink subframe according to the present embodiment. In FIG. 4, the horizontal axis is a time axis and the vertical axis is a frequency axis. In the downlink subframe, the base station device 3 may transmit the downlink physical channel (the PBCH, the PCFICH, the PHICH, the PDCCH, the EPDCCH, or the PDSCH), and the downlink physical signal (the synchronization signal or the downlink reference signal). Moreover, the PBCH is transmitted only on subframe 0 within the radio frame. Moreover, the downlink reference signal is mapped to the resource elements that are distributed in the frequency domain and the time domain. The downlink reference signal is not illustrated in FIG. 4 for brief description.

Furthermore, multiple PDCCH's may be frequency-multiplexed or time-multiplexed in a PDCCH region. Multiple EPDCCH's may be frequency-multiplexed, time-multiplexed, and space-multiplexed in an EPDCCH region. Multiple PDSCH's may be frequency-multiplexed and time-multiplexed in a PDSCH region. The PDCCH and, the PDSCH or the EPDCCH may be time-multiplexed. The PDSCH and the EPDCCH may be frequency-multiplexed.

Figure 5:
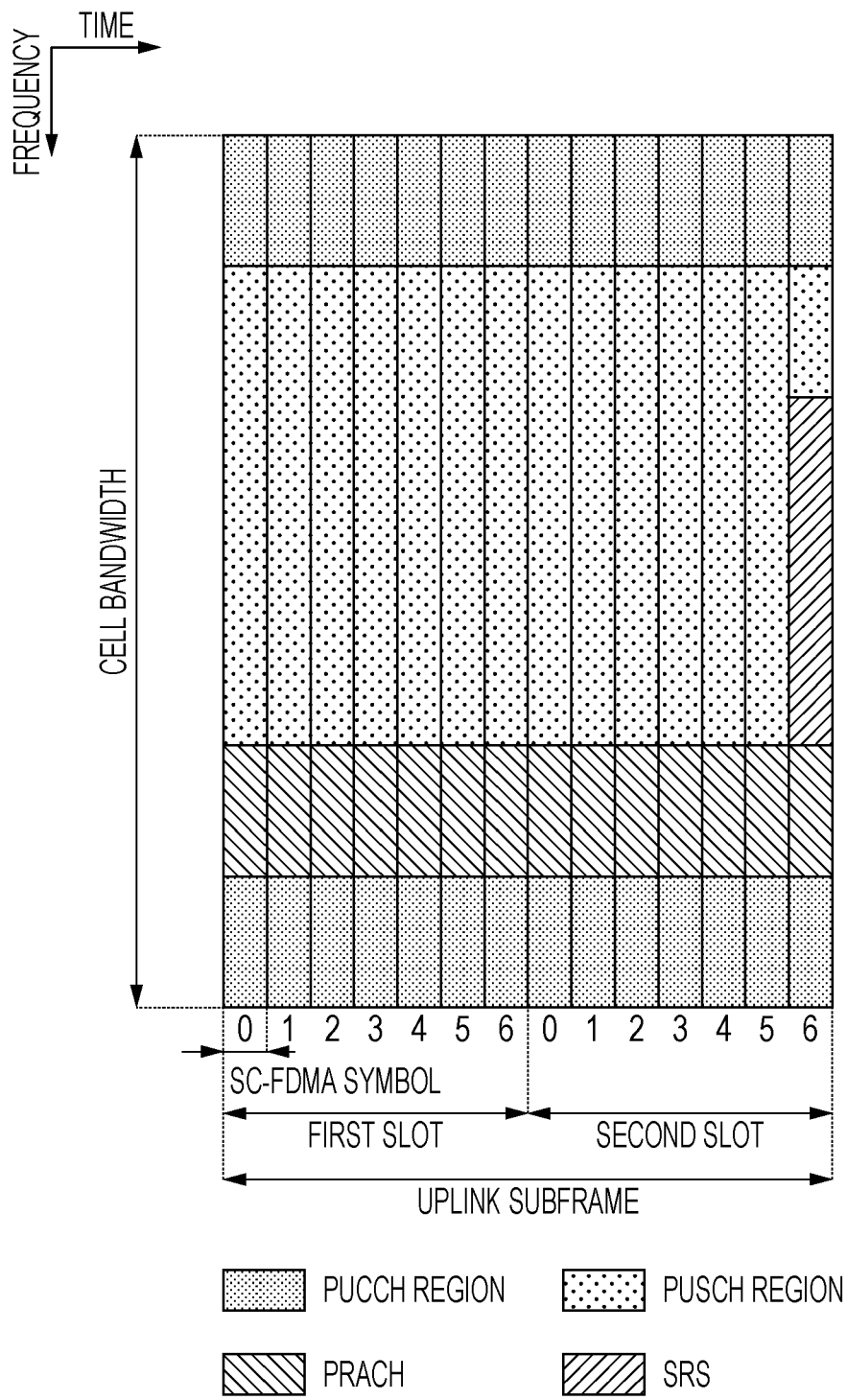
FIG. 5 is a diagram illustrating one example of the allocation of the physical channel and the mapping of the physical signal to an uplink subframe according to the present embodiment.

FIG. 5 is a diagram illustrating one example of the allocation of the physical channel and the physical signal in the uplink subframe according to the present embodiment. In FIG. 5, the horizontal axis is a time axis and the vertical axis is a frequency axis. In the uplink subframe, the mobile station device 1 may transmit the uplink physical channel (the PUCCH, the PUSCH or the PRACH) and the uplink physical signal (the DMRS or the SRS). In a PUCCH region, multiple PUCCH's are frequency-multiplexed, time-multiplexed, and code-multiplexed. In a PUSCH region, multiple PUSCH's are frequency-multiplexed and space-multiplexed. The PUCCH and the PUSCH may be frequency-multiplexed. The PRACH may be allocated over a single subframe or two subframes. Furthermore, multiple PRACH' may be code-multiplexed.

The SRS is transmitted using the last SC-FDMA symbol within the uplink subframe. To be more precise, the SRS is mapped to the last SC-FDMA symbol within the uplink subframe. The mobile station device 1 cannot transmit the SRS and the PUCCH/PUSCH/PRACH at the same time in a single SC-FDMA symbol in a single cell. In a single uplink subframe in the single cell, the mobile station device 1 can transmit the PUSCH and/or the PUCCH using the SC-FDMA symbol with the last SC-FDMA symbol within the uplink subframe being excluded, and can transmit the SRS using the last SC-FDMA symbol within the uplink subframe. To be more precise, in the single uplink subframe in the single cell, the mobile station device 1 can transmit both of the SRS and the PUSCH/PUCCH at the same time. Moreover, the DMRS is time-multiplexed together with the PUCCH or the PUSCH. The DMRS is not illustrated in FIG. 5 for brief description.

Figure 6:
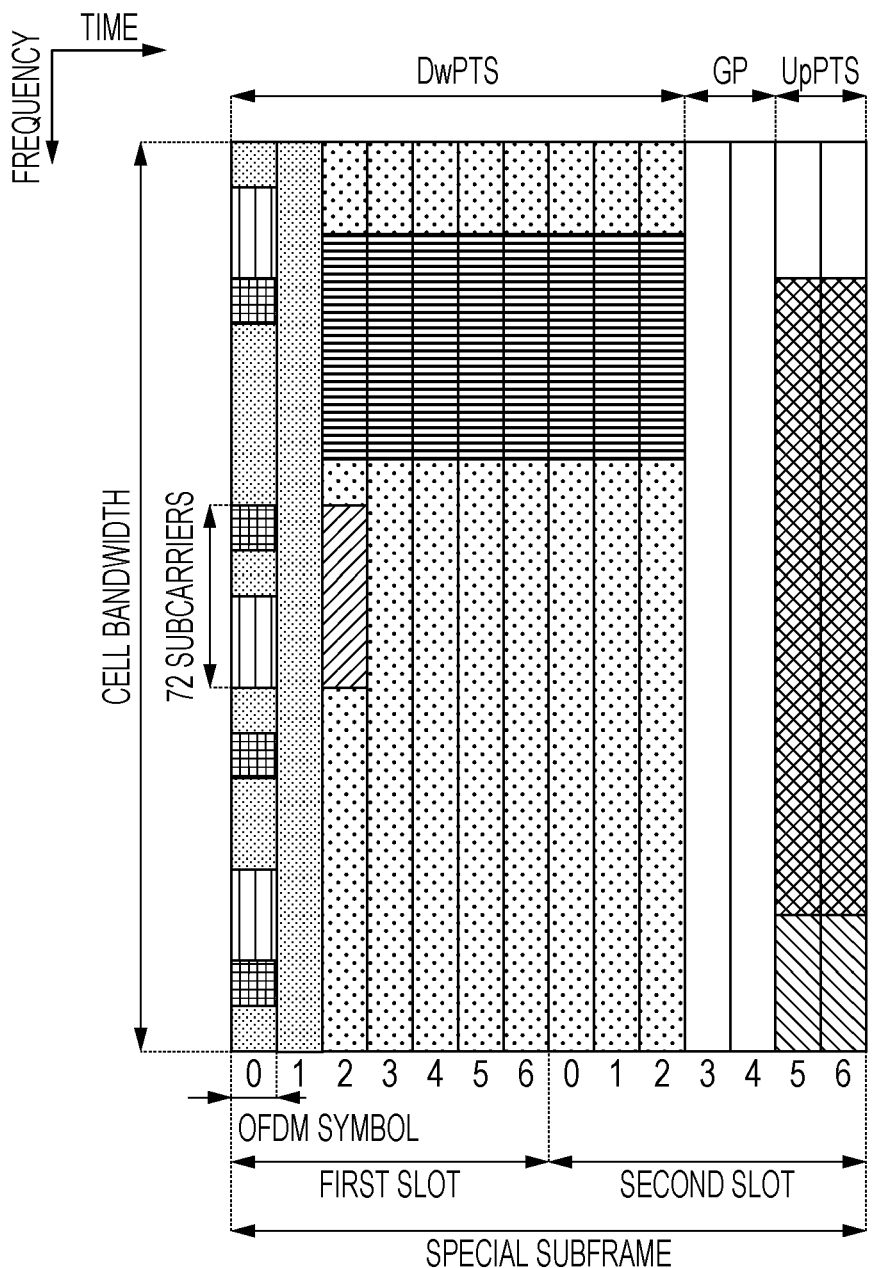
FIG. 6 is a diagram illustrating one example of the allocation of the physical channel and the mapping of the physical signal to a special subframe according to the present embodiment.

FIG. 6 is a diagram illustrating one example of the allocation of the physical channel and the mapping of the physical signals to the special subframe according to the present embodiment. In FIG. 6, the horizontal axis is a time axis and the vertical axis is a frequency axis. In FIG. 6, the DwPTS is configured from first to 10-th SC-FDMA symbols within the special subframe, the GP is configured from 11-th and 12-th SC-FDMA symbols within the special subframe, and the UpPTS is configured from 13-th and 14-th SC-FDMA symbols within the special subframe.

The base station device 3 may transmit the PCFICH, the PHICH, the PDCCH, the EPDCCH, the PDSCH, the synchronization signal, and the downlink reference signal, in the DwPTS of the special subframe. The base station device 3 does not transmit the PBCH in the DwPTS of the special subframe. The mobile station device 1 may transmit the PRACH and the SRS in the UpPTS of the special subframe. To be more precise, the mobile station device 1 does not transmit the PUCCH, the PUSCH, and the DMRS in the UpPTS of the special subframe.

Figure 7:
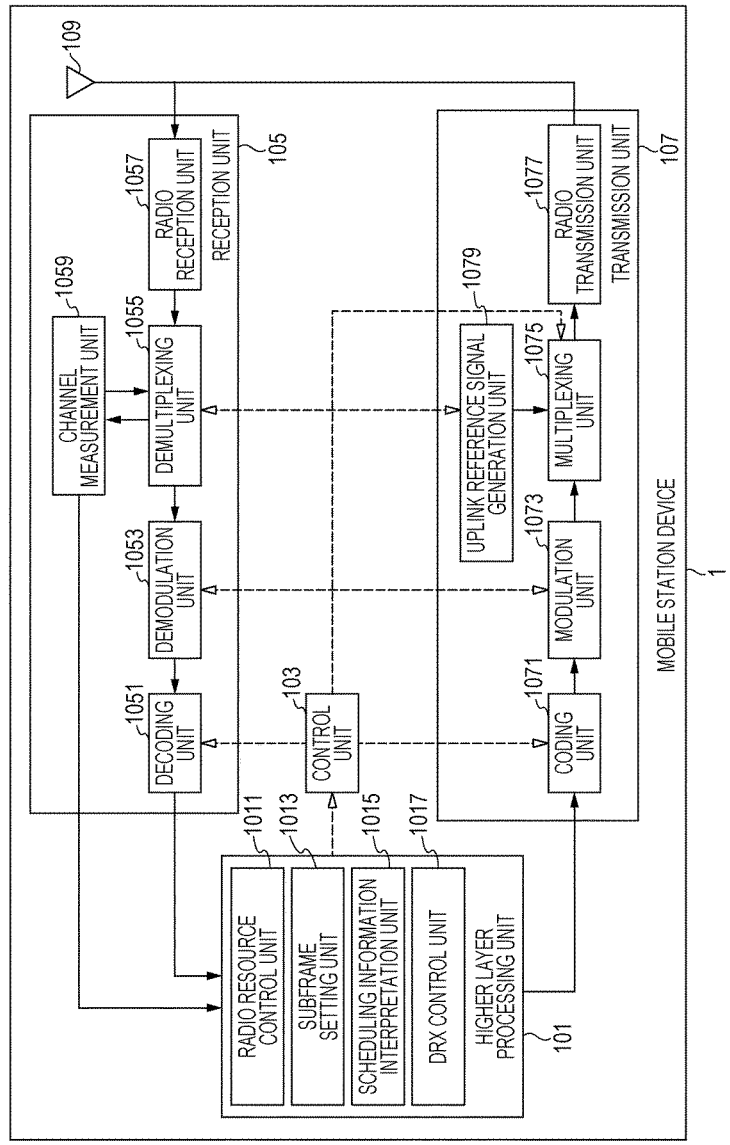
FIG. 7 is a schematic block diagram illustrating a configuration of a mobile station device 1 according to the present embodiment.

FIG. 7 is a schematic block diagram illustrating a configuration of the mobile station device 1 according to the present invention. As illustrated, the mobile station device 1 is configured to include a higher layer processing unit 101, a control unit 103, a reception unit 105, a transmission unit 107, and a transmit and receive antenna unit 109. Furthermore, the higher layer processing unit 101 is configured to include a radio resource control unit 1011, a subframe setting unit 1013, a scheduling information interpretation unit 1015, and a channel state information (CSI) report control unit 1017. Furthermore, the reception unit 105 is configured to include a decoding unit 1051, a demodulation unit 1053, a demultiplexing unit 1055, a radio reception unit 1057, and a channel measurement unit 1059. Furthermore, the transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation and the like, to the transmission unit 107. Furthermore, the higher layer processing unit 101 performs processing of a medium access control (MAC) layer, a packet data convergence protocol (PDCP) layer, a radio link control (RLC) layer, and a radio resource control (RRC) layer.

The radio resource control unit 1011 that is included in the higher layer processing unit 101 performs management of various pieces of configuration information of the mobile station device 1 itself. Furthermore, the radio resource control unit 1011 generates information that is arranged in each channel for uplink, and outputs the generated information to the transmission unit 107.

The subframe setting unit 1013 that is included in the higher layer processing unit 101 manages a first uplink reference UL-DL configuration, a first downlink reference UL-DL configuration, a second uplink reference UL-DL configuration, a second downlink reference UL-DL configuration, and a transmission direction UL-DL configuration (transmission direction configuration).

The subframe setting unit 1013 sets the first uplink reference UL-DL configuration, the first downlink reference UL-DL configuration, the second uplink reference UL-DL configuration, the second downlink reference UL-DL configuration, and the transmission direction UL-DL configuration. Furthermore, the subframe setting unit 1013 sets at least two subframe sets.

The scheduling information interpretation unit 1015 that is included in the higher layer processing unit 101 interprets the DCI format (scheduling information) that is received through the reception unit 105, generates control information for performing control of the reception unit 105 and the transmission unit 107 based on a result of interpreting the DCI format, and outputs the generated control information to the control unit 103.

The scheduling information interpretation unit 1015 additionally determines timing at which transmission processing and reception processing are performed, based on the first uplink reference UL-DL configuration, the first downlink reference UL-DL configuration, the second uplink reference UL-DL configuration, the second downlink reference UL-DL configuration, and/or the transmission direction UL-DL configuration.

A CSI report control unit 1017 specifies a CSI reference resource. The CSI report control unit 1017 instructs the channel measurement unit 1059 to derive a CQI relating to the CSI reference resource. The CSI report control unit 1017 instructs the transmission unit 107 to transmit the CQI. The CSI report control unit 1017 sets a configuration that is used when the channel measurement unit 1059 calculates the CQI.

The control unit 103 generates a control signal for performing the control of the reception unit 105 and the transmission unit 107 based on control information from the higher layer processing unit 101. The control unit 103 outputs the generated control signal to the reception unit 105 and the transmission unit 107, and performs the control of the reception unit 105 and the transmission unit 107.

In accordance with the control signal that is input from the control unit 103, the reception unit 105 demultiplexes, demodulates, and decodes a reception signal that is received from the base station device 3 through the transmit and receive antenna 109, and outputs the resulting information to the higher layer processing unit 101.

The radio reception unit 1057 converts (down-converts) a downlink signal that is received through the transmit and receive antenna unit 109 into an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio reception unit 1057 removes a portion equivalent to a guard interval (GI) from the digital signal that results from the conversion, performs fast Fourier Transform (FFT) on the signal from which the guard interval is removed, and extracts a signal in the frequency domain.

The demultiplexing unit 1055 demultiplexes the extracted signal into the PHICH, the PDCCH, the EPDCCH, the PDSCH, and the downlink reference signal. Furthermore, the demultiplexing unit 1055 makes an adjustment of channels, that is, the PHICH, the PDCCH, the EPDCCH, and the PDSCH, from a channel estimate that is input from the channel measurement unit 1059. Furthermore, the demultiplexing unit 1055 outputs the downlink reference signal, which results from the demultiplexing, to the channel measurement unit 1059.

The demodulation unit 1053 multiplies the PHICH by a corresponding code for composition, performs demodulation in compliance with a Binary Phase Shift Keying (BPSK) modulation scheme on the resulting composite signal, and outputs a result of the demodulation to the decoding unit 1051. The decoding unit 1051 decodes the PHICH destined for the mobile station device 1 itself, and outputs the HARQ indicator that results from the decoding to the higher layer processing unit 101. The demodulation unit 1053 performs the demodulation in compliance with a QPSK modulation scheme on the PDCCH and/or the EPDCCH, and outputs a result of the demodulation to the decoding unit 1051. The decoding unit 1051 attempts to perform the decoding of the PDCCH and/or the EPDCCH. In a case where the decoding unit 1051 succeeds in the decoding, the decoding unit 1051 outputs downlink control information that results from the decoding and an RNTI to which the downlink control information corresponds, to the higher layer processing unit 101.

The demodulation unit 1053 performs the demodulation on the PDSCH in compliance with the modulation scheme that is notified with the downlink grant, such as Quadrature Phase Shift keying (QPSK), 16 Quadrature Amplitude Modulation (QAM), or 64 QAM, and outputs a result of the demodulation to the decoding unit 1051. The decoding unit 1051 performs the decoding based on information relating to a coding rate that is notified with the downlink control information, and outputs to the higher layer processing unit 101 the downlink data (the transport block) that results from the decoding.

The channel measurement unit 1059 measures a downlink path loss or a channel state from the downlink reference signal that is input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055. The channel measurement unit 1059 measures channel measurement and/or interference measurement in order to calculate the CQI.

The transmission unit 107 generates the uplink reference signal in accordance with the control signal, which is input from the control unit 103, performs the coding and the modulation on the uplink data (the transport block), which is input from the higher layer processing unit 101, multiplexes the PUCCH, the PUSCH, and the generated uplink reference signal, and transmits a result of the multiplexing to the base station device 3 through the transmit and receive antenna 109.

The coding unit 1071 performs the coding, such as convolutional coding and block coding, on the uplink control information that is input from the higher layer processing unit 101. Furthermore, the coding unit 1071 performs turbo coding, based on information that is used for the scheduling of PUSCH.

The modulation unit 1073 performs the modulation on coded bits, which are input from the coding unit 1071, in compliance with the modulation scheme that is notified with the downlink control information, such as the BPSK, the QPSK, the 16 QAM, or the 64 QAM, or in compliance with a modulation scheme that is prescribed in advance for every channel. Based on the information that is used for the scheduling of the PUSCH, the modulation unit 1073 determines the number of sequences of pieces of data that are space-multiplexed, maps multiple pieces of uplink data that are transmitted on the same PUSCH, to multiple sequences, by using Multiple Input Multiple Output Spatial Multiplexing (MIMO SM), and performs precoding on the sequences.

The uplink reference signal generation unit 1079 generates a sequence that is acquired according to a rule (formula) that is prescribed in advance, based on a physical cell identifier (which is also referred to as a physical cell identity (PCI), a CELL ID, or the like) for identifying the base station device 3, a bandwidth to which the uplink reference signal is mapped, a cyclic shift that is notified with the uplink grant, a parameter value for generation of a DMRS sequence, and the like. In accordance with the control signal that is input from the control unit 103, the multiplexing unit 1075 rearranges modulation symbols of the PUSCH in parallel and then performs Discrete Fourier Transform (DFT) on the rearranged modulation symbols. Furthermore, the multiplexing unit 1075 multiplexes PUCCH and PUSCH signals and the generated uplink reference signal for every transmit antenna port. To be more precise, the multiplexing unit 1075 maps the PUCCH and PUSCH signals and the generated uplink reference signal to the resource elements for every transmit antenna port.

The radio transmission unit 1077 performs Inverse Fast Fourier Transform (IFFT) on a signal that results from the multiplexing, performs the modulation in compliance with an SC-FDMA scheme, generates an SC-FDMA symbol, attaches the guard interval to the SC-FDMA-modulated SC-FDMA symbol, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a signal in a high frequency, removes unnecessary frequency components, performs power amplification, and outputs a final result to the transmit and receive antenna 109 for transmission.

Figure 8:
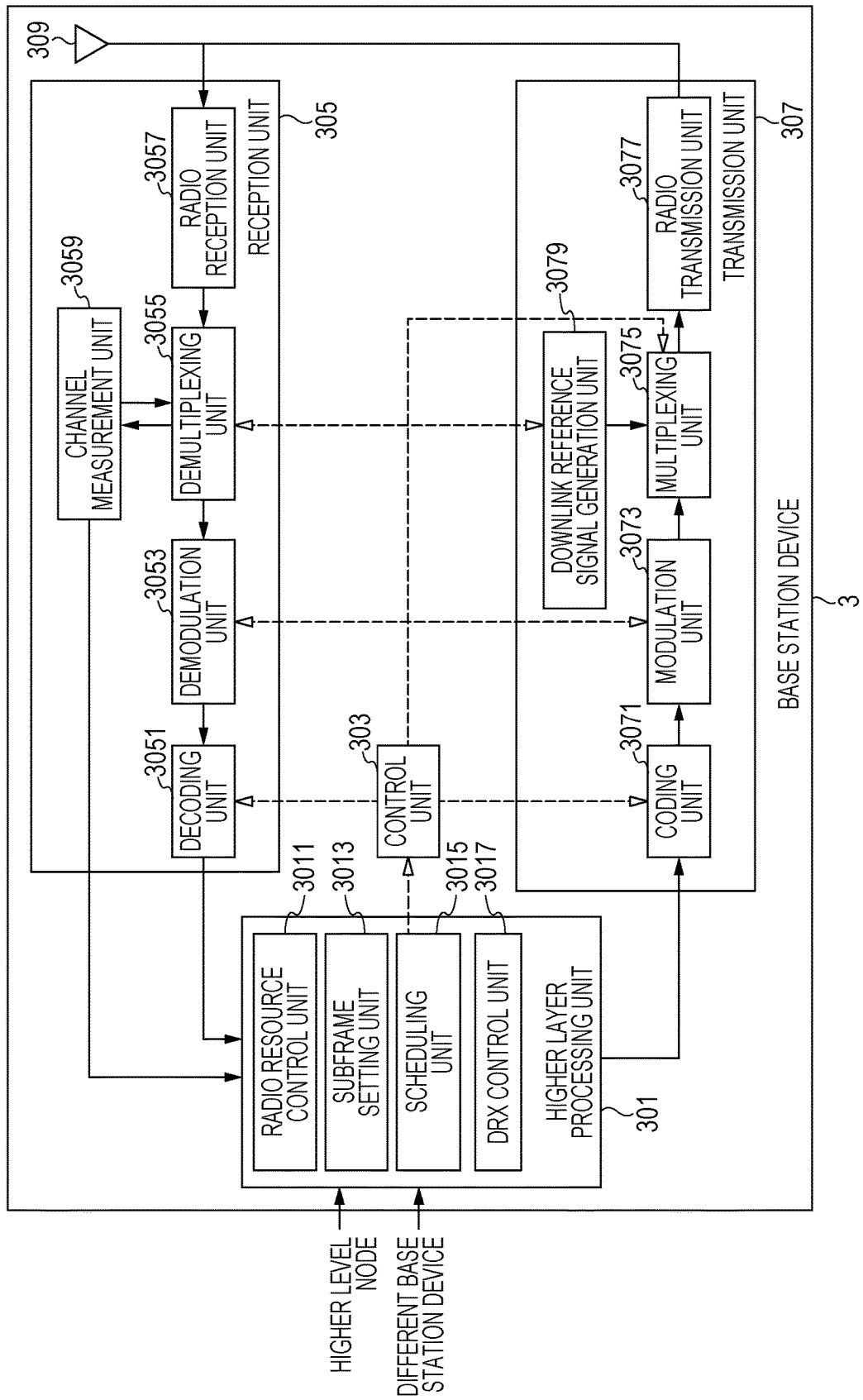
FIG. 8 is a schematic block diagram illustrating a configuration of a base station device 3 according to the present embodiment.

FIG. 8 is a schematic block diagram illustrating a configuration of the base station device 3 according to the present embodiment. As is illustrated, the base station device 3 is configured to include a higher layer processing unit 301, a control unit 303, a reception unit 305, a transmission unit 307, and a transmit and receive antenna 309. Furthermore, the higher layer processing unit 301 is configured to include a radio resource control unit 3011, a subframe setting unit 3013, a scheduling unit 3015, and a CSI report control unit 3017. Furthermore, the reception unit 305 is configured to include a decoding unit 3051, a demodulation unit 3053, a demultiplexing unit 3055, a radio reception unit 3057, and a channel measurement unit 3059. Furthermore, the transmission unit 307 is configured to include a coding unit 3071, a modulation unit 3073, a multiplexing unit 3075, a radio transmission unit 3077, and a downlink reference signal generation unit 3079.

The higher layer processing unit 301 performs the processing of the Medium Access Control (MAC) layer, the packet data convergence protocol (PDCP) layer, the radio link control (RLC) layer, and the radio resource control (RRC) layer. Furthermore, the higher layer processing unit 301 generates a control signal in order to perform control of the reception unit 305 and the transmission unit 307, and outputs the generated control information to the control unit 303.

The radio resource control unit 3011 that is included in the higher layer processing unit 301 generates, or acquires from a higher level node, the downlink data (the transport block) that is arranged in the downlink PDSCH, system information, the RRC message, the MAC control element (CE), and the like, and outputs a result of the generation or of the acquirement to the transmission unit 307. Furthermore, the radio resource control unit 3011 manages various pieces of configuration information on each of the mobile station devices 1.

The subframe setting unit 3013 that is included in the higher layer processing unit 301 performs management of the first uplink reference UL-DL configuration, the first downlink reference UL-DL configuration, the second uplink reference UL-DL configuration, the second downlink reference UL-DL configuration, and the transmission direction UL-DL configuration, on each of the mobile station devices 1.

The subframe setting unit 3013 sets the first uplink reference UL-DL configuration, the first downlink reference UL-DL configuration, the second uplink reference UL-DL configuration, the second downlink reference UL-DL configuration, and the transmission direction UL-DL configuration, for each of the mobile station devices 1.

The subframe setting unit 3013 generates first information showing the first uplink reference UL-DL configuration, second information showing the first downlink reference UL-DL configuration, and third information showing the transmission direction UL-DL configuration. The subframe setting unit 3013 outputs the first information, the second information, and the third information to the mobile station device 1 through the transmission unit 307.

The base station device 3 may determine the first uplink reference UL-DL configuration, the first downlink reference UL-DL configuration, the second uplink reference UL-DL configuration, the second downlink reference UL-DL configuration, and/or the transmission direction UL-DL configuration, for the mobile station device 1. Furthermore, the base station device 3 may be instructed by the higher level node to set the first uplink reference UL-DL configuration, the first downlink reference UL-DL configuration, the second uplink reference UL-DL configuration, the second downlink reference UL-DL configuration, and/or the transmission direction UL-DL configuration, for the mobile station device 1.

For example, based on an amount of uplink traffic and an amount of downlink traffic, the subframe setting unit 3013 may determine the first uplink reference UL-DL configuration, the first downlink reference UL-DL configuration, the second uplink reference UL-DL configuration, the second downlink reference UL-DL configuration, and/or the transmission direction UL-DL configuration.

The subframe setting unit 3013 performs management of at least two subframe sets. The subframe setting unit 3013 may configure at least two subframe sets for each of the mobile station devices 1. The subframe setting unit 3013 may configure at least two subframe sets on each of the serving cells. The subframe setting unit 3013 may configure at least two subframe sets for each CSI process.

The subframe setting unit 3013 transmits information showing at least two subframe sets to the mobile station device 1 through the transmission unit 307.

The scheduling unit 3015 that is included in the higher layer processing unit 301 determines a frequency and a subframe to which the physical channel (the PDSCH and the PUSCH) is allocated, the coding rate and modulation scheme for the physical channel (the PDSCH and the PUSCH), the transmission power, and the like, from the received channel state information and from the channel estimate, channel quality, or the like that is input from the channel measurement unit 3059. The scheduling unit 3015 determines whether, in a flexible subframe, the downlink physical channel and/or the downlink physical signal is scheduled or the uplink physical channel and/or the uplink physical signal is scheduled. The scheduling unit 3015 generates the control information (for example, the DCI format) in order to perform the control of the reception unit 305 and the transmission unit 307 based on a result of the scheduling, and outputs the generated information to the control unit 303.

The scheduling unit 3015 generates the information that is used for the scheduling of the physical channel (the PDSCH and the PUSCH), based on the result of the scheduling. The scheduling unit 3015 additionally determines the timing at which the transmission processing and the reception processing are performed, based on the first uplink reference UL-DL configuration, the first downlink reference UL-DL configuration, the second uplink reference UL-DL configuration, the second downlink reference UL-DL configuration, and/or the transmission direction UL-DL configuration.

The CSI report control unit 3017 that is included in the higher layer processing unit 301 controls a CSI report by the mobile station device 1. The CSI report control unit 3017 transmits information that is assumed in order for the mobile station device 1 to derive the CQI in the CSI reference resource, and that shows various configurations, to the mobile station device 1 through the transmission unit 307.

Based on the control information from the higher layer processing unit 301, the control unit 303 generates a control signal for performing the control of the reception unit 305 and the transmission unit 307. The control unit 303 outputs the generated control signal to the reception unit 305 and the transmission unit 307, and performs the control of the reception unit 305 and the transmission unit 307.

In accordance with the control signal that is input from the control unit 303, the reception unit 305 demultiplexes, demodulates, and decodes the reception signal that is received from the mobile station device 1 through the transmit and receive antenna 309, and outputs the resulting information to the higher layer processing unit 301. The radio reception unit 3057 converts (down-converts) an uplink signal that is received through the transmit and receive antenna unit 309 into an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 3057 removes a portion corresponding to the guard interval (GI) from the digital signal that results from the conversion. The radio reception unit 3057 performs the Fast Fourier Transform (FFT) on the signal from which the guard interval is removed, and outputs the resulting signal to the demultiplexing unit 3055 that extracts the signal in the frequency domain.

The demultiplexing unit 1055 demultiplexes the signal that is input from the radio reception unit 3057 into the PUCCH, the PUSCH, and the signal such as the uplink reference signal. Moreover, the demultiplexing is performed based on radio resource allocation information that is determined in advance by the base station device 3, using the radio resource control unit 3011, and that is included in the uplink grant notified to each of the mobile station devices 1. Furthermore, the demultiplexing unit 3055 makes an adjustment of channels, that is, the PUCCH and the PUSCH, from the channel estimate that is input from the channel measurement unit 3059. Furthermore, the demultiplexing unit 3055 outputs an uplink reference signal that results from the demultiplexing, to the channel measurement unit 3059.

The demodulation unit 3053 performs Inverse Discrete Fourier Transform (IDFT) on the PUSCH, acquires the modulation symbol, and performs reception signal demodulation on each of the modulation symbols of the PUCCH and the PUSCH, using the modulation scheme that is prescribed in advance, such as the Binary Phase Shift Keying (BPSK), the QPSK, the 16 QAM, or the 64 QAM, or using the modulation scheme that the base station device 3 itself notifies, in advance with the uplink grant, to each of the mobile station devices 1. The demodulation unit 3053 demultiplexes the modulation symbols of the multiple pieces of uplink data that are transmitted on the same PUSCH by using the MIMO SM, based on the number of space-multiplexed sequences that is notified in advance with the uplink grant to each of the mobile station devices 1 and on information indicating the precoding that is performed on the sequences.

The decoding unit 3051 performs the decoding on the coded bits of the PUCCH and the PUSCH, which are demodulated, at the coding rate in compliance with a coding scheme prescribed in advance, which is prescribed in advance, or which is notified in advance with the uplink grant to the mobile station device 1 by the base station device 3 itself, and outputs to the higher layer processing unit 101 the uplink data and the uplink control information that are decoded. In a case where the PUSCH is re-transmitted, the decoding unit 3051 performs the decoding using the coded bits that are input from the higher layer processing unit 301 and that are retained in a HARQ buffer, and the demodulated coded bits. The channel measurement unit 309 measures the channel estimate or the channel quality, and the like, based on the uplink reference signal that is input from the demultiplexing unit 3055, and outputs a result of the measurement to the demultiplexing unit 3055 and the higher layer processing unit 301.

The transmission unit 307 generates the downlink reference signal in accordance with the control signal that is input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the mobile station device 1 through the transmit and receive antenna 309.

The coding unit 3071 performs the coding on the HARQ indicator, the downlink control information, and the downlink data that are input from the higher layer processing unit 301, using the coding scheme that is prescribed in advance, such as the block coding, the convolutional coding, or the turbo coding, or using the coding scheme that is determined by the radio resource control unit 3011. The modulation unit 3073 performs the modulation on the coded bits that are input from the coding unit 3071, using the modulation scheme that is prescribed in advance, such as the BPSK, the QPSK, the 16 QAM, or the 64 QAM, or using the modulation scheme that is determined by the radio resource control unit 3011.

The downlink reference signal generation unit 3079 generates as the downlink reference signal a sequence that is already known to the mobile station device 1 and that is acquired according to a rule that is prescribed in advance based on the physical cell identifier (PCI) for identifying the base station device 3, and the like. The multiplexing unit 3075 multiplexes the modulated modulation symbol of each channel and the generated downlink reference signal. To be more precise, the multiplexing unit 3075 arranges the modulated modulation symbol of each channel and the generated downlink reference signal in the resource elements.

The radio transmission unit 3077 performs the Inverse Fast Fourier Transform (IFFT) on the modulation symbol that results from the multiplexing, performs the modulation in compliance with an OFDM scheme, generates an OFDM symbol, attaches the guard interval to the OFDM-modulated OFDM symbol, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a signal in a high frequency, removes unnecessary frequency components, performs power amplification, and outputs a final result to the transmit and receive antenna 309 for transmission.

The first uplink reference UL-DL configuration (uplink reference uplink-downlink configuration), the first downlink reference UL-DL configuration (downlink reference uplink-downlink configuration), the second uplink reference UL-DL configuration, the second downlink reference UL-DL configuration, and the transmission direction UL-DL configuration (transmission direction uplink-downlink configuration) will be described below.

The first uplink reference UL-DL configuration, the first downlink reference UL-DL configuration, the second uplink reference UL-DL configuration, a second downlink reference UL-DL configuration, and the transmission direction UL-DL configuration are defined by an uplink-downlink configuration (UL-DL configuration).

The uplink-downlink configuration is a configuration relating to a pattern of a subframe within the radio frame. That is, the uplink-downlink configuration shows which of the downlink subframe, the uplink subframe and the special subframe each of the subframes within the radio frame is.

To be more precise, the first uplink reference UL-DL configuration, the second uplink reference UL-DL configuration, the first downlink reference UL-DL configuration, the second downlink reference UL-DL configuration, and the transmission direction UL-DL configuration are defined by patterns of the downlink subframe, the uplink subframe, and the special subframe within the radio frame.

The patterns of the downlink subframe, the uplink subframe, and the special subframe shows which of the downlink subframe, the uplink subframe, and the special subframe each of subframes #0 to #9 is, and are preferably expressed by arbitrary combinations of D, U, and S (which shows the downlink subframe, the uplink subframe, and the special subframe, respectively), in each of which a sum of lengths of D, U, and S is 10. More preferably, the head subframe (to be more precise, subframe #0) is D, and the second subframe is S (to be more precise, subframe #1).

FIG. 9 illustrates one example of the uplink-downlink configuration according to the present embodiment. In FIG. 9, D denotes a downlink subframe, U denotes an uplink subframe, and S denotes a special subframe.

In FIG. 9, subframe 1 within the radio frame is always a special subframe. In FIG. 9, subframes 0 and 5 are always reserved for the downlink transmission, and subframe 2 is always reserved for the uplink transmission.

In FIG. 9, in a case where a downlink-uplink switch-point periodicity is 5 ms, subframe 6 within the radio frame is a special subframe. In a case where the downlink-uplink switch-point periodicity is 10 ms, subframe 6 within the radio frame is a downlink subframe.

The first uplink reference UL-DL configuration is also referred to as a first parameter, a first configuration or a serving cell uplink-downlink configuration. The first downlink reference UL-DL configuration is also referred to as a second parameter or a second configuration. The second uplink reference UL-DL configuration is also referred to as a third parameter or a third configuration. The second downlink reference UL-DL configuration is also referred to as a fourth parameter or a fourth configuration. The transmission direction UL-DL configuration is also referred to as a fifth parameter or a fifth configuration.

Setting of uplink-downlink configuration i as the first or second uplink reference UL-DL configuration is referred to as setting of first or second uplink reference UL-DL configuration i. Setting of uplink-downlink configuration i as the first or second downlink reference UL-DL configuration is referred to as setting of first or second downlink reference UL-DL configuration i. Setting of uplink-downlink configuration i as the transmission direction UL-DL configuration is referred to as setting of transmission direction UL-DL configuration i.

A method of setting the first uplink reference UL-DL configuration, the first downlink reference UL-DL configuration, and the transmission direction UL-DL configuration will be described below.

The base station device 3 sets the first uplink reference UL-DL configuration, the first downlink reference UL-DL configuration, and the transmission direction UL-DL configuration. The base station device 3 transmits the first information (TDD-Config) showing the first uplink reference UL-DL configuration, the second information showing the first downlink reference UL-DL configuration, and the third information showing the transmission direction UL-DL configuration, with the first information, the second information, and the third information being included in at least one of a MIB, a system information block type 1 message, a system information message, an RRC message, a MAC control element (CE), and physical layer control information (for example, a DCI format). Furthermore, the base station device 3 may include the first information, the second information, and the third information in any one of the MIB, the system information block type 1 message, the system information message, the RRC message, the MAC control element (CE), and the physical layer control information (for example, the DCI format), depending on a situation.

For each of the multiple serving cells, the first uplink reference UL-DL configuration, the second uplink reference UL-DL configuration, the first downlink reference UL-DL configuration, the second downlink reference UL-DL configuration, and the transmission direction UL-DL configuration may be defied.

The base station device 3 transmits the first information, the second information, and the third information to the mobile station device 1 for which multiple serving cells are set. Moreover, for each of the serving cells, the first information, the second information, and the third information may be defined.

The base station device 3 may transmit the first information for the primary cell, the second information for the primary cell, the third information for the primary cell, the first information for the secondary cell, the second information for the secondary cell, and the third information for the secondary cell, to the mobile station device 1 for which two serving cells, each being configured from one primary cell and one secondary cell, is set for.

The mobile station device 1 for which multiple serving cells are set may set the first uplink reference UL-DL configuration, the first downlink reference UL-DL configuration, and the transmission direction DL-UL configuration for each of the serving cells, based on the first information, the second information, and the third information.

The mobile station device 1 for which the two serving cells, each being configured from one primary cell and one secondary cell, are set, may set the first uplink reference UL-DL configuration for the primary cell, the first downlink reference UL-DL configuration for the primary cell, the transmission direction DL-UL configuration for the primary cell, the first uplink reference UL-DL configuration for the secondary cell, the first downlink reference UL-DL configuration for the secondary cell, and the transmission direction DL-UL configuration for the secondary cell.

The first information for the primary cell is desirably included in the system information block type 1 message or the RRC message. The first information for the secondary cell is desirably included in the RRC message. The second information for the primary cell is desirably included in the system information block type 1 message, the system information message, or the RRC message. The second information for the secondary cell is desirably included in the RRC message. The third information is desirably included in the physical layer control information (for example, the DCI format).

The first information is desirably common to multiple mobile station devices 1 within a cell. The second information may be common to the multiple mobile station devices 1 within the cell and may be dedicated to the mobile station device 1. The third information may be common to the multiple mobile station devices 1 within the cell and may be dedicated to the mobile station device 1.

Initial transmission of the system information block type 1 message is performed through the PDSCH on subframe 5 of a radio frame that satisfies SFN mod 8=0, and is re-transmitted, and re-transmission (repetition) thereof is performed on subframe 5 of a different radio frame that satisfies SFN mod 2=0. The system information block type 1 message includes information showing a configuration (lengths of DwPTS, GP, and UpPTS) of a special subframe. The system information block type 1 message is cell-specific information.

The system information message is transmitted through the PDSCH. The system information message is cell-specific information. The system information message includes a system information block X other than the system information block type-1.

The RRC message is transmitted through the PDSCH. The RRC message is information or a signal that is processed in an RRC layer. The RRC message may be common to multiple mobile station devices 1 within a cell, and may be dedicated to a specific mobile station device 1.

The MAC CE is transmitted through the PDSCH. The MAC CE is information or a signal that is processed in a MAC layer.

In a case where, in a subframe n–k, the physical layer control information (for example, the DCI format) including the first information, the second information, and/or the third information is received through the downlink physical channel (for example, the PDCCH/EPDCCH), the mobile station device 1 desirably sets (enables) the first uplink reference UL-DL configuration, the first downlink reference UL-DL configuration, and/or the transmission direction UL-DL configuration in a subframe n. For example, k is 4 or 8. For example, a subframe n+k is a subframe on which to transmit the HARQ-ACK (the ACK) for the downlink physical channel (for example, the PDCCH/EPDCCH) that is used for transmission of the physical layer control information (for example, the DCI format). For example, k is determined based on a table in FIG. 21 and a current first or second downlink reference UL-DL configuration.

In a case where, in the radio frame n-k, the physical layer control information (for example, the DCI format) including the third information is received through the downlink physical channel (for example, the PDCCH/EPDCCH), the mobile station device 1 desirably sets (enables) the transmission direction UL-DL configuration in the radio frame n. For example, k is 1. The third information that is received on the radio frame n-k may be effective only for the radio frame n.

Figure 10:
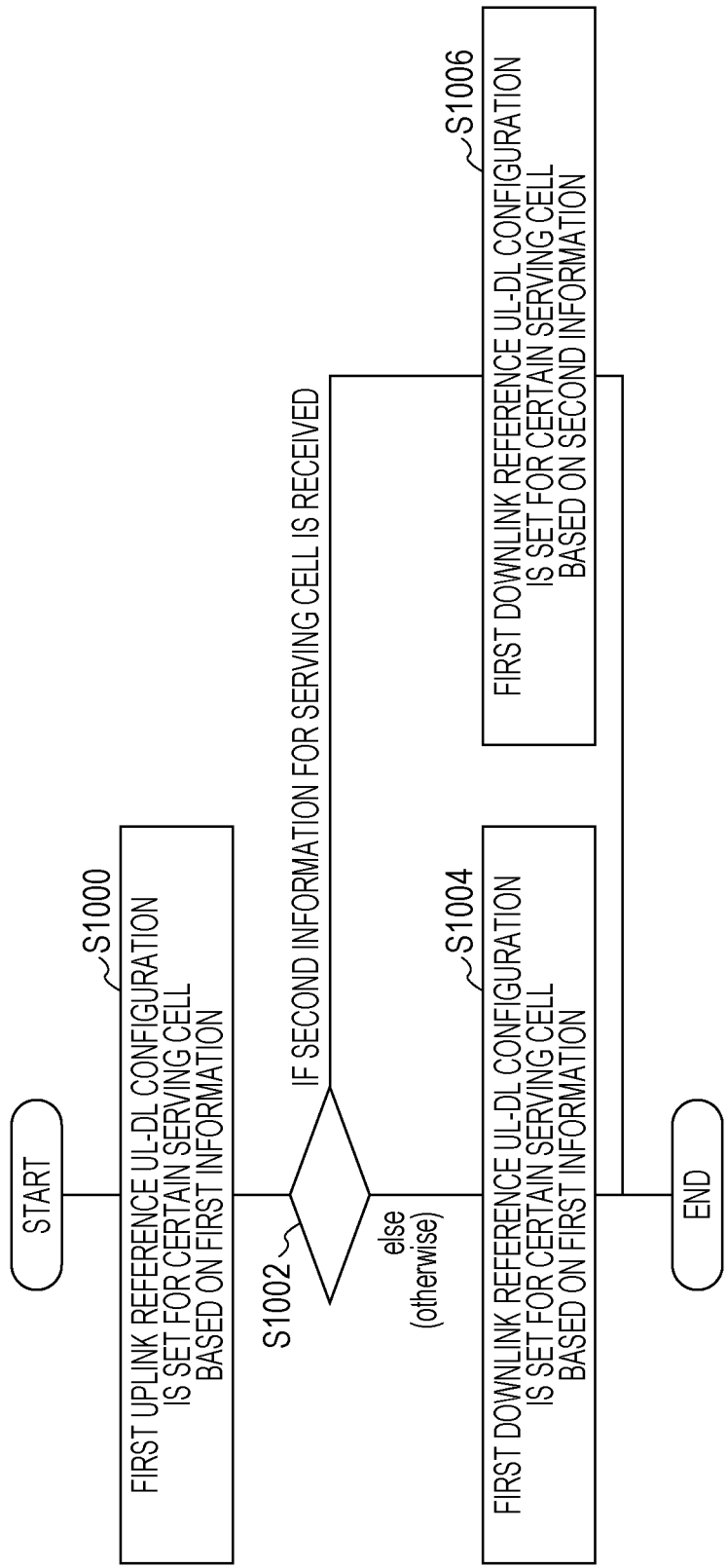
FIG. 10 is a flowchart illustrating a method of setting a first uplink reference UL-DL configuration and a first downlink reference UL-DL configuration according to the present embodiment.

FIG. 10 is a flowchart illustrating a method of setting the first uplink reference UL-DL configuration and the first downlink reference UL-DL configuration according to the present embodiment. The mobile station device 1 performs a setting method in FIG. 10 on each of the multiple serving cells.

The mobile station device 1 sets the first uplink reference UL-DL configuration for a certain serving cell based on the first information (S1000). The mobile station device 1 determines whether or not the second information for the certain serving cell is received (S1002). In a case where the second information for the certain serving cell is received, the mobile station device 1 sets the first downlink reference UL-DL configuration for the serving cell, based on the second information for the certain serving cell (S1006). In a case where the second information for the certain serving cell is not received (else or otherwise), the mobile station device 1 sets the first downlink reference UL-DL configuration for the serving cell, based on the first information for the certain serving cell (S1004).

The serving cell for which the first uplink reference UL-DL configuration and the first downlink reference UL-DL configuration are set based on the first information is also referred to as a serving cell for which timing TDD is not set. The serving cell for which the first downlink reference UL-DL configuration is set based on the second information is also referred to as a serving cell for which the timing TDD is set.

The mobile station device 1 receives the second information and, based on the second information, determines a subframe that is available for the transmission of the uplink signal. Next, the mobile station device 1 monitors the third information. In a case where the third information is received, the mobile station device 1 determines a subframe that is available for the transmission of the uplink signal based on the third information.

For example, the base station device 3 transmits third information to the mobile station device 1 using the PDCCH/EPDCCH. The third information performs control of the timing TDD operation within a coverage that is provided by the base station device 3 (a cell). The third information is transmitted and received in a common search space (CSS) or a UE-specific search space (USS).

The CSS is a region in which multiple mobile station devices 1, in common, performs monitoring of the PDCCH/EPDCCH. The USS is a region that is defined based on at least the C-RNTI. The C-RNTI is an identifier that is allocated in a manner that is unique to the mobile station device 1.

The C-RNTI may be used for transmission of the DCI format that includes the third information (information indicating transmission direction for a subframe). The RNTI that is different from the C-RNTI and the SPS C-RNTI may be used for the transmission of the DCI format that includes the third information (information indicating the transmission direction for the subframe). The RNTI is referred to as an X-RNTI. To be more precise, the CRC parity bit that is attached to the DCI format that includes the third information is scrambled with the C-RNTI or the X-RNTI.

Furthermore, a subframe in which the mobile station device 1 monitors the PDCCH/EPDCCH that includes the third information may be limited. The base station device 3 may control a subframe in which the mobile station device 1 monitors the PDCCH/EPDCCH that includes the third information. The base station device 3 may transmit information indicating the subframe in which the mobile station device 1 monitors the PDCCH/EPDCCH that includes the third information, to the mobile station device 1.

For example, the PDCCH/EPDCCH that includes the third information is allocated at intervals of 10 subframes. For example, the mobile station device 1 monitors the third information at intervals of 10 subframes. The subframe to which the PDCCH/EPDCCH that includes the third information is allocated may be determined in advance. For example, the third information may be arranged only in subframe 0 or 5 of the radio frame.

The mobile station device 1 that starts the timing TDD operation performs the monitoring of the PDCCH/EPDCCH that includes the third information, in the subframe to which the PDCCH/EPDCCH that includes the third information is allocated.

The mobile station device 1 attempts to decode the received signal, and determines whether or not the PDCCH/EPDCCH that includes the third information is detected. In a case where the PDCCH/EPDCCH that includes the third information is detected, the mobile station device 1 determines a subframe that is available for the transmission of the uplink signal, based on the detected third information. In a case where the PDCCH/EPDCCH that includes the third information is not detected, the mobile station device 1 may maintain the determination made so far of the subframe that is available for the transmission of the uplink signal.

A method of setting the second uplink reference UL-DL configuration will be described below.

In a case where multiple serving cells are set for the mobile station device 1 and the first uplink reference UL-DL configurations for at least two serving cells are different from each other, the mobile station device 1 and the base station device 3 set the second uplink reference UL-DL configuration.

In cases other than the case where the multiple serving cells are set for the mobile station device 1 and the first uplink reference UL-DL configurations for at least two serving cells are different from each other, the mobile station device 1 and the base station device 3 may not set the second uplink reference UL-DL configuration.

In cases other than the case where the first uplink reference UL-DL configurations for at least two serving cells are different from each other, the first uplink reference UL-DL configurations for all the serving cells are the same. In a case where one serving cell is set for the mobile station device 1, the mobile station device 1 and the base station device 3 may not set the second uplink reference UL-DL configuration.

Figure 11:
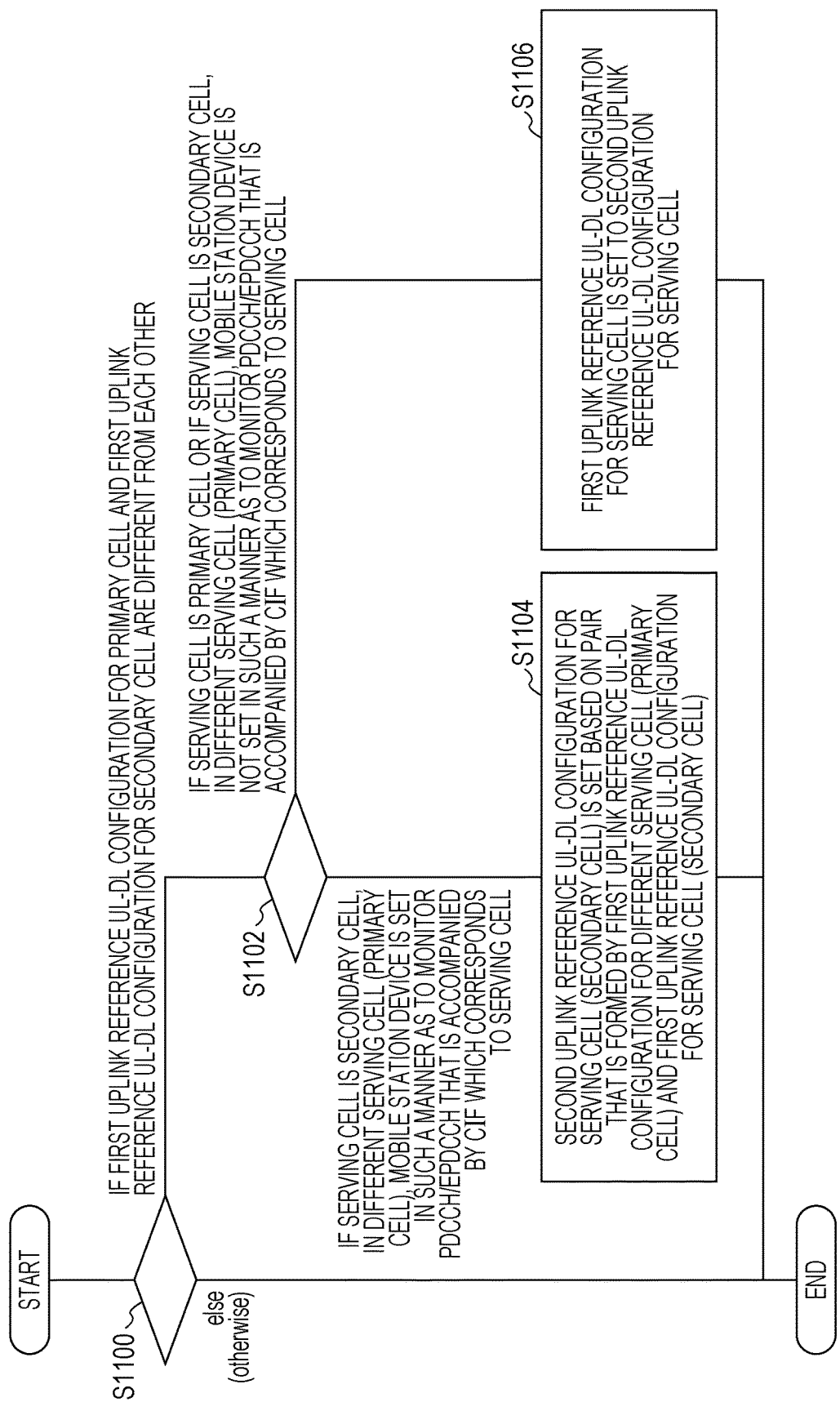
FIG. 11 is a flowchart illustrating a method of setting a second uplink reference UL-DL configuration according to the present embodiment.

FIG. 11 is a flowchart illustrating a method of setting the second uplink reference UL-DL configuration according to the present embodiment. In FIG. 11, one primary cell and one secondary cell are set for the mobile station device 1. The mobile station device 1 performs the setting method in FIG. 11 on each of the primary cell and the secondary cell.

The mobile station device 1 determines whether or not the first uplink reference UL-DL configuration for the primary cell and the first uplink reference UL-DL configuration for the second cell are different from each other (S1100). In a case where the first uplink reference UL-DL configuration for the primary cell and the first uplink reference UL-DL configuration for the secondary cell are the same, the mobile station device 1 ends processing that sets the second uplink reference UL-DL configuration, without setting the second uplink reference UL-DL configuration.

In a case where the first uplink reference UL-DL configuration for the primary cell and the first uplink reference UL-DL configuration for the secondary cell are different from each other, the mobile station device 1 determines whether or not the serving cell is a primary cell or a secondary cell, and/or whether or not the serving cell is set in such a manner that the PDCCH/EPDCCH that is accompanied by a carrier indicator field (CIF) which corresponds to the serving cell is monitored (S1102).

In a case where the serving cell is a secondary cell, and, in a different cell (the primary cell), is set in such a manner that the PDCCH/EPDCCH which is accompanied by the CIF that corresponds to the serving cell (the secondary cell) is monitored, the mobile station device 1 sets the second uplink reference UL-DL configuration for the serving cell (the secondary cell), based on a pair that is formed by the first uplink reference UL-DL configuration for the different serving cell (the primary cell) and the first uplink reference UL-DL configuration for the serving cell (the serving cell) (S1104).

In S1104, the mobile station device 1 sets the second uplink reference UL-DL configuration for the serving cell (the secondary cell) based on a table in FIG. 12. FIG. 12 is a diagram illustrating a correspondence between a pair that is formed by the first uplink reference UL-DL configuration for a different serving cell (the primary cell) and the first uplink reference UL-DL configuration for the serving cell (the secondary cell), and the second uplink reference UL-DL configuration for the secondary cell, according to the present embodiment.

In FIG. 12, a primary cell UL-DL configuration refers to the first uplink reference UL-DL configuration for the different serving cell (the primary cell). In FIG. 12, a secondary cell UL-DL configuration refers to the first uplink reference UL-DL configuration for the serving cell (the secondary cell).

For example, in a case where a first uplink reference UL-DL configuration 0 is set for a different serving cell (the primary cell) and a first uplink reference UL-DL configuration 2 is set for the serving cell (the secondary cell), a second uplink reference UL-DL configuration 1 is set for the secondary cell.

In a case where the serving cell is a primary cell, or the serving cell is a secondary cell, and, in a different cell (the primary cell), the serving cell is set in such a manner that the PDCCH/EPDCCH that is accompanied by the CIF which corresponds to the serving cell (the secondary cell) is not monitored, the mobile station device 1 sets the first uplink reference UL-DL configuration for the serving cell to the second uplink reference UL-DL configuration for the serving cell (S1106).

The base station device 3 sets the second uplink reference UL-DL configuration based on the setting method in FIG. 11.

The monitoring of the PDCCH/EPDCCH that is accompanied by the CIF means attempting to decode the PDCCH or the EPDCCH according to the DCI format that includes the CIF. The CIF is a field to which a carrier indicator is mapped. A value of the carrier indicator shows a serving cell to which the DCI format to which the carrier indicator relates corresponds.

The mobile station device 1 that is set in such a manner as to monitor the PDCCH/EPDCCH that is accompanied by the CIF which corresponds to a serving cell in a different serving cell monitors the PDCCH/EPDCCH that is accompanied by the CIF in the different serving cell.

The mobile station device 1 that is set in such a manner as to monitor the PDCCH/EPDCCH which is accompanied by the CIF that corresponds to a serving cell in a different serving cell desirably receives the third information for the serving cell through the PDCCH/EPDCCH in the different serving cell.

The mobile station device 1 that is not set in such a manner as to monitor the PDCCH/EPDCCH that is accompanied by the CIF which corresponds to a serving cell in the different serving cell monitors the PDCCH/EPDCCH that is accompanied by the CIF or is not accompanied by the CIF in the serving cell.

The mobile station device 1 that is not set in such a manner as to monitor the PDCCH/EPDCCH which is accompanied by the CIF that corresponds to a serving cell in a different serving cell desirably receives the third information for the serving cell through the PDCCH/EPDCCH in the serving cell.

The PDCCH/EPDCCH for the primary cell is transmitted in the primary cell. The third information for the primary cell is desirably transmitted through the PDCCH/EPDCCH in the primary cell.

The base station device 3 transmits to the mobile station device 1 a parameter (cif-Presence-r10) showing whether or not the CIF is included in the DCI format that is transmitted in the primary cell.

For each of the secondary cells, the base station device 3 transmits to the mobile station device 1 a parameter (CrossCarrierSchedulingConfig-r10) relating to cross carrier scheduling.

The parameter (CrossCarrierSchedulingConfig-r10) includes a parameter (schedulingCellInfo-r10) showing whether or not the PDCCH/EPDCCH that corresponds to a related secondary cell is transmitted in the secondary cell or is transmitted in a different serving cell.

In a case where the parameter (schedulingCellInfo-r10) indicates that the PDCCH/EPDCCH which corresponds to a related secondary cell is transmitted on the secondary cell, the parameter (schedulingCellInfo-r10) includes a parameter (cif-Presence-r10) showing whether or not the CIF is included in the DCI format that is transmitted in the secondary cell.

In a case where the parameter (schedulingCellInfo-r10) indicates that the PDCCH/EPDCCH which corresponds to a related secondary cell is transmitted in a different serving cell, the parameter (schedulingCellInfo-r10) includes a parameter (schedulingCellId) showing which serving cell the downlink allocation for the related secondary cell is sent in.

A method of setting the second downlink reference UL-DL configuration will be described below.

In a case where multiple serving cells are set for the mobile station device 1 and the first downlink reference UL-DL configurations for at least two serving cells are different from each other, the mobile station device 1 and the base station device 3 set the second downlink reference UL-DL configuration. In cases other than the case where the multiple serving cells are set for the mobile station device 1 and the first downlink reference UL-DL configurations for at least two serving cells are different from each other, the mobile station device 1 and the base station device 3 may not set the second downlink reference UL-DL configuration.

In cases other than the case where the first downlink reference UL-DL configurations for at least two serving cells are different from each other, the first downlink reference UL-DL configurations for all the serving cells are the same. In the case where one serving cell is set for the mobile station device 1, the mobile station device 1 and the base station device 3 may not set the second downlink reference UL-DL configuration.

Figure 13:
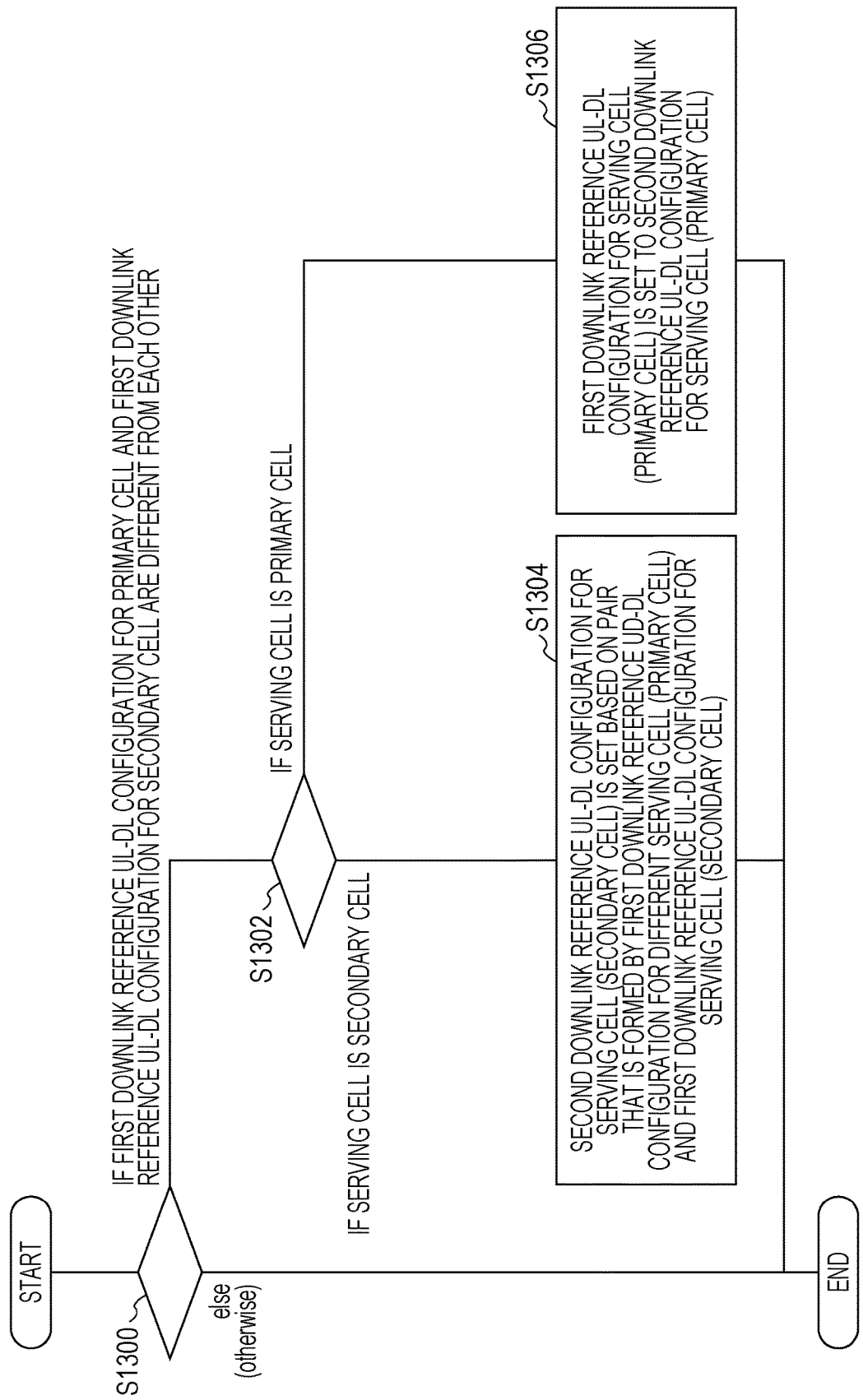
FIG. 13 is a flowchart illustrating a method of setting a second downlink reference UL-DL configuration according to the present embodiment.

FIG. 13 is a flowchart illustrating a method of setting the second downlink reference UL-DL configuration according to the present embodiment. In FIG. 13, one primary cell and one secondary cell are set for the mobile station device 1. The mobile station device 1 performs the setting method in FIG. 13 on each of the primary cell and the secondary cell.

The mobile station device 1 determines whether or not the first downlink reference UL-DL configuration for the primary cell and the first downlink reference UL-DL configuration for the second cell are different from each other (S1300). In a case where the first downlink reference UL-DL configuration for the primary cell and the first downlink reference UL-DL configuration for the secondary cell are the same, the mobile station device 1 ends processing that sets the second downlink reference UL-DL configuration, without setting the second downlink reference UL-DL configuration.

In a case where whether or not the first downlink reference UL-DL configuration for the primary cell and the first downlink reference UL-DL configuration for the second cell are different from each other, the mobile station device 1 determines whether or not the serving cell is a primary cell or a secondary cell (S1302).

In a case where the serving cell is a secondary cell, the second uplink reference UL-DL configuration for the serving cell (the secondary cell) is set based on the pair that is formed by the first downlink reference UL-DL configuration for the different serving cell (the primary cell) and the first downlink reference UL-DL configuration for the serving cell (the secondary cell) (S1304).

In S1304, the mobile station device 1 sets the second downlink reference UL-DL configuration for the serving cell (the secondary cell) based on a table in FIG. 14. FIG. 14 is a diagram illustrating a correspondence between a pair that is formed by the first downlink reference UL-DL configuration for the primary cell and the first downlink reference UL-DL configuration for the secondary cell, and the second downlink reference UL-DL configuration for the secondary cell, according to the present embodiment.

In FIG. 14, the primary cell UL-DL configuration refers the first downlink reference UL-DL configuration for the primary cell. In FIG. 14, the secondary cell UL-DL configuration refers the first downlink reference UL-DL configuration for the secondary cell.

In a case where the pair that is formed by the first downlink reference UL-DL configuration for the primary cell and the first downlink reference UL-DL configuration for the secondary cell belongs to set 1 in FIG. 14, the second downlink reference UL-DL configuration for the secondary cell is defined in set 1.

In a case where, in the primary cell, the mobile station device 1 is not set in such a manner as to monitor the PDCCH/EPDCCH that is accompanied by the CIF which corresponds to the secondary cell, and the pair that is formed by the first downlink reference UL-DL configuration for the primary cell and the first downlink reference UL-DL configuration for the secondary cell belongs to set 2 in FIG. 14, the second downlink reference UL-DL configuration for the secondary cell is defined in set 2.

In a case where, in the primary cell, the mobile station device 1 is not set in such a manner as to monitor the PDCCH/EPDCCH that is accompanied by the CIF which corresponds to the secondary cell, and the pair that is formed by the first downlink reference UL-DL configuration for the primary cell and the first downlink reference UL-DL configuration for the secondary cell belongs to set 3 in FIG. 14, the second downlink reference UL-DL configuration for the secondary cell is defined in set 3.

In a case where, in the primary cell, the mobile station device 1 is set in such a manner as to monitor the PDCCH/EPDCCH that is accompanied by the CIF which corresponds to the secondary cell, and the pair that is formed by the first downlink reference UL-DL configuration for the primary cell and the first downlink reference UL-DL configuration for the secondary cell belongs to set 4 in FIG. 14, the second downlink reference UL-DL configuration for the secondary cell is defined in set 4.

In a case where, in the primary cell, the mobile station device 1 is set in such a manner as to monitor the PDCCH/EPDCCH that is accompanied by the CIF which corresponds to the secondary cell, and the pair that is formed by the first downlink reference UL-DL configuration for the primary cell and the first downlink reference UL-DL configuration for the secondary cell belongs to set 5 in FIG. 14, the second downlink reference UL-DL configuration for the secondary cell is defined in set 5.

For example, in a case where a first downlink reference UL-DL configuration 1 is set for the primary cell and a first downlink reference UL-DL configuration 0 is set for the secondary cell, a second downlink reference UL-DL configuration 1 is set for the secondary cell.

In a case where the serving cell is a primary cell, the first downlink reference UL-DL configuration for the serving cell (the primary cell) is set to the second downlink reference UL-DL configuration for the serving cell (the primary cell) (S1306).

Moreover, the base station device 3 also sets the second downlink reference UL-DL configuration based on the setting method in FIG. 13.

The first uplink reference UL-DL configuration will be described below.

The first uplink reference UL-DL configuration is at least used for specifying a subframe that is available or is not available for the uplink transmission in the serving cell.

The mobile station device 1 does not perform the uplink transmission in the subframe that is indicated, as the downlink subframe, by the first uplink reference UL-DL configuration. The mobile station device 1 does not perform the uplink transmission in the DwPTS and the GP of the subframe that is indicated, as the special subframe, by the first uplink reference UL-DL configuration.

The first downlink reference UL-DL configuration will be described below.

The first downlink reference UL-DL configuration is at least used for specifying a subframe that is available or is not available for the downlink transmission in the serving cell.

The mobile station device 1 does not perform the downlink transmission in the subframe that is indicated, as the uplink subframe, by the first downlink reference UL-DL configuration. The mobile station device 1 does not perform the downlink transmission in the UpPTS and the GP of the subframe that is indicated, as the special subframe, by the first downlink reference UL-DL configuration.

The mobile station device 1 that sets the first downlink reference UL-DL configuration based on the first information may also perform measurement (for example, measurement relating to the channel state information) that uses the downlink signal in the DwPTS of the downlink subframe or the special subframe that is indicated by the first uplink reference UL-DL configuration or the first downlink reference UL-DL configuration.

The base station device 3 determines the downlink reference UL-DL configuration from a configuration set (set configuration) that is limited based on the first uplink reference UL-DL configuration. To be more precise, the first downlink reference UL-DL configuration is an element in the configuration set that is limited based on the first uplink reference UL-DL configuration. The condition set that is limited on the first uplink reference UL-DL configuration includes the uplink-downlink configuration that satisfies the following conditions (a) to (c). FIG. 15 is a diagram illustrating a relationship between the subframe that is indicated by the first uplink reference UL-DL configuration and the subframe that is indicated by the first downlink reference UL-DL configuration, according to the present embodiment. In FIG. 15, D denotes a downlink subframe, U denotes an uplink subframe, and S denotes a special subframe.

Condition (a): A subframe that is indicated, as a downlink subframe, by the first uplink reference UL-DL configuration is indicated as the downlink subframe.

Condition (b): A subframe that is indicated, as uplink subframe, by the first uplink reference UL-DL configuration is indicated as an uplink subframe or a downlink subframe.

Condition (c): A subframe that is indicated, as a special subframe, by the first uplink reference UL-DL configuration is indicated as a downlink subframe or a special subframe.

Accordingly, because, in the timing TDD, with the first uplink reference UL-DL configuration, the DwPTS's of the downlink subframe, the indicated subframe, and the special subframe are not used for the uplink transmission, the mobile station device 1 that sets the first downlink reference UL-DL configuration based on the first information can suitably perform the measurement that uses the downlink signal.

Moreover, the mobile station device 1 that sets the first downlink reference UL-DL configuration based on the second information may also perform the measurement (for example, the measurement relating to the channel state information) that uses the downlink signal in the DwPTS of the downlink subframe or the special subframe that is indicated by the first uplink reference UL-DL configuration.

The subframe that is indicated as the uplink subframe by the first uplink reference UL-DL configuration and that is indicated as the downlink subframe by the first downlink reference UL-DL configuration is also referred to as a first flexible subframe. The first flexible subframe is a subframe that is reserved for the uplink and downlink transmission.

The subframe that is indicated as the special subframe by the first uplink reference UL-DL configuration and that is indicated as the downlink subframe by the first downlink reference UL-DL configuration is also referred to as a second flexible subframe. The second flexible subframe is a subframe that is reserved only for the downlink transmission. The second flexible subframe is a subframe that is reserved for the downlink transmission in the DwPTS and the uplink transmission in the UpPTS.

The transmission direction UL-DL configuration will be described in detail below.

The mobile station device 1 and the base station device 3 set the transmission direction UL-DL configuration relating to a transmission direction (uplink/downlink) in the subframe. The transmission direction UL-DL configuration is used to determine the transmission direction in the subframe.

The mobile station device 1 controls the transmission in the first flexible subframe and the second flexible subframe based on the scheduling information (the DCI format and/or the HARQ-ACK) and the transmission direction UL-DL configuration.

The base station device 3 transmits to the mobile station device 1 the third information that shows the transmission direction UL-DL configuration. The third information is information that indicates a subframe which is available for the uplink transmission. The third information is information that shows a subframe which is available for the downlink transmission. The third information is information that shows a subframe which is available for the uplink transmission in the UpPTS and for the downlink transmission in the DwPTS.

For example, the transmission direction UL-DL configuration is used to specify the transmission direction, in the subframe that is indicated, as the uplink subframe, by the first uplink reference UL-DL configuration and that is indicated, as the downlink subframe, by the first downlink reference UL-DL configuration, and/or in the subframe that is indicated, as the special subframe, by the first uplink reference UL-DL configuration and that is indicated, as the downlink subframe, by the first downlink reference UL-DL configuration. To be more precise, the transmission direction UL-DL configuration is used to specify the transmission direction in the subframe that is indicated as a subframe different from that in the first uplink reference UL-DL configuration and the first downlink reference UL-DL configuration.

FIG. 16 is a diagram illustrating a relationship among the subframe that is indicated by the first uplink reference UL-DL configuration, the subframe that is indicated by the first downlink reference UL-DL configuration, and the subframe that is indicated by the transmission direction UL-DL configuration, according to the present embodiment. In FIG. 16, D denotes a downlink subframe, U denotes an uplink subframe, and S denotes a special subframe.

The base station device 3 determines the transmission direction UL-DL configuration from the configuration (the set configuration) that is limited based the first uplink reference UL-DL configuration and the first downlink reference UL-DL configuration. To be more precise, the transmission direction UL-DL configuration is an element in the configuration set that is limited based on the first uplink reference UL-DL configuration and the first downlink reference UL-DL configuration. The configuration set that is limited based on the first uplink reference UL-DL configuration and the first downlink reference UL-DL configuration includes the uplink-downlink configuration that satisfies the following conditions (d) to (h).

Condition (d): A subframe that is indicated, as a downlink subframe, by the first uplink reference UL-DL configuration and the first downlink reference UL-DL configuration is indicated as the downlink subframe.

Condition (e): A subframe that is indicated, as an uplink subframe, by the first uplink reference UL-DL configuration and the first downlink reference UL-DL configuration is indicated as the uplink subframe.

Condition (f): A subframe that is indicated, as an uplink subframe, by the first uplink reference UL-DL configuration, but is indicated, as a downlink subframe, by the first downlink reference UL-DL configuration, is indicated as the uplink subframe or the downlink subframe.

Condition (g): A subframe that is indicated, as a special subframe, by the first uplink reference UL-DL configuration and the first downlink reference UL-DL configuration is indicated as the special subframe.

Condition (h): A subframe that is indicated, as a special subframe, by the first uplink reference UL-DL configuration, but is indicated, as a downlink subframe, by the first downlink reference UL-DL configuration is indicated as the special subframe and the downlink subframe.

The base station device 3 may perform scheduling of the downlink transmission in the subframe that is indicated, as the downlink subframe, by the transmission direction UL-DL configuration.

The mobile station device 1 may perform the reception processing of the downlink signal in the subframe that is indicated, as the downlink subframe, by the transmission direction UL-DL configuration. The mobile station device 1 may perform monitoring of the PDCCH/EPDCCH in the subframe that is indicated, as the downlink subframe, by the transmission direction UL-DL configuration. The mobile station device 1 may perform the reception processing of the PDSCH in the subframe that is indicated, as the downlink subframe, by the transmission direction UL-DL configuration, based on detection of the downlink grant through the PDCCH/EPDCCH.

Furthermore, in a case where the transmission of the uplink signal (the PUSCH/SRS) in the subframe that is indicated, as the downlink subframe, by the transmission direction UL-DL configuration is scheduled or set, the mobile station device 1 does not perform the transmission processing of the uplink signal (the PUSCH/SRS) in the subframe.

The base station device 3 may perform scheduling of the uplink transmission in the subframe that is indicated, as the uplink subframe, by the transmission direction UL-DL configuration.

The base station device 3 may perform scheduling of the downlink transmission in the subframe that is indicated, as the uplink subframe, by the transmission direction UL-DL configuration. The scheduling of the downlink transmission by the base station device 3 may be prohibited in the subframe that is indicated, as the uplink subframe, by the transmission direction UL-DL configuration.

The mobile station device 1 may perform the reception processing of the downlink signal in the subframe that is indicated, as the downlink subframe, by the transmission direction UL-DL configuration. Furthermore, in a case where the transmission of the uplink signal (the PUSCH/DMRS/SRS) in the subframe that is indicated, as the uplink subframe, by the transmission direction UL-DL configuration is scheduled or set, the mobile station device 1 may perform the transmission processing of the uplink signal (the PUSCH/DMRS/SRS) in the subframe.

The mobile station device 1 may perform the reception processing of the downlink signal in the subframe that is indicated, as the uplink subframe, by the transmission direction UL-DL configuration and in which the transmission of the uplink is not scheduled. The reception processing of the downlink signal by the mobile station device 1 may be prohibited in the subframe that is indicated, as the uplink subframe, by the transmission direction UL-DL configuration.

The base station device 3 may perform the scheduling of the downlink transmission in the DwPTS of the subframe that is indicated, as the special subframe, by the transmission direction UL-DL configuration.

The mobile station device 1 may perform the reception processing of the downlink signal in the DwPTS of the subframe that is indicated, as the special subframe, by the transmission direction UL-DL configuration. The mobile station device 1 may perform the monitoring of the PDCCH/EPDCCH in the DwPTS of the subframe that is indicated, as the special subframe, by the transmission direction UL-DL configuration. The mobile station device 1 may perform the reception processing of the PDSCH in the DwPTS of subframe that is indicated, as the special subframe, by the transmission direction UL-DL configuration, based on the detection of the downlink grant through the PDCCH/EPDCCH.

In a case where the transmission of the PUSCH in the subframe that is indicated, the special subframe, by the transmission direction UL-DL configuration, the mobile station device 1 does not perform the transmission processing of the PUSCH in the subframe.

In a case where the transmission of the SRS in the UpPTS of the subframe that is indicated, as the special subframe, by the transmission direction UL-DL configuration, is scheduled or set, the mobile station device 1 may perform the transmission processing of the SRS in the UpPTS of the subframe.

The CRS, the PDCCH, the PHICH, and/or the PCFICH may not be transmitted in the first flexible subframe that is indicated, as the downlink subframe, by the transmission UL-DL configuration. In this case, the EPDCCH and the PDSCH are transmitted in the first flexible subframe that is used as the downlink subframe.

The base station device 3 may control whether or not the CRS, the PDCCH, the PHICH, and/or the PCFICH are transmitted in the first flexible subframe that is indicated, as the downlink subframe, by the transmission direction UL-DL configuration. In this case, the base station device 3 transmits to the mobile station device 1 a CRS parameter showing whether or not the CRS, the PDCCH, the PHICH, and/or the PCFICH are transmitted in the first flexible subframe that is indicated, as the downlink subframe, by the transmission direction UL-DL configuration, and the mobile station device 1 sets the CRS parameter.

The CRS may not be transmitted in a GP and an UpPTS field of the second flexible subframe that is indicated, as the downlink subframe, by the transmission direction UL-DL configuration. The base station device 3 may control whether or not the CRS is transmitted in the second flexible subframe that is indicated, as the downlink subframe, by the transmission direction UL-DL configuration. In this case, based on the CRS parameter, the mobile station device 1 may determine whether or not the CRS is transmitted in the GP and the UpPTS field of the second flexible subframe that is indicated, as the downlink subframe, by the transmission direction UL-DL configuration.

FIG. 17 is a diagram illustrating a relationship among the first uplink reference UL-DL configuration, the first downlink reference UL-DL configuration, and the transmission direction UL-DL configuration, according to the present embodiment.

For example, in FIG. 17, in a case where the first uplink reference UL-DL configuration 0, the first downlink reference UL-DL configuration is one among sets {0, 1, 2, 3, 4, 5, 6}. For example, in FIG. 17, in a case where the first uplink reference UL-DL configuration is 1, the first downlink reference UL-DL configuration is one among sets {1, 2, 4, 5}.

For example, in FIG. 17, in a case where the first uplink reference UL-DL configuration is 0 and the first downlink reference UL-DL configuration is 1, the transmission direction UL-DL configuration is one among sets {0, 1, 6}.

Moreover, a value of the first downlink reference UL-DL configuration may be the same as a value of the first uplink reference UL-DL configuration. However, because the mobile station device 1 that does not receive the second information sets the same value as a value of the first uplink reference UL-DL configuration, as the first downlink reference UL-DL configuration, the value of the first downlink reference UL-DL configuration that is shown by the second information is preferably not the same as the value of the first uplink reference UL-DL configuration that is shown by the first information.

In a case where the value of the first uplink reference UL-DL configuration and the value of the first downlink reference UL-DL configuration are the same, the transmission direction UL-DL configuration may not be defined. Furthermore, in the case where the value of the first uplink reference UL-DL configuration and the value of the first downlink reference UL-DL configuration are the same, the value of the first uplink reference UL-DL configuration and the value of the first downlink reference UL-DL configuration may be set for the transmission direction UL-DL configuration.

The third information may be information that shows the transmission direction UL-DL configuration from the configuration set (the set configuration) that is configured from the first uplink reference UL-DL configuration and the first downlink reference UL-DL configuration.

The first uplink reference UL-DL configuration and the second uplink reference UL-DL configuration will be described in detail below.

The first uplink reference UL-DL configuration and the second uplink reference UL-DL configuration are used to specify (select or determine) a correspondence between a subframe n to which the PDCCH/EPDCCH/PHICH is allocated and a subframe n+k to which the PUSCH to which the PDCCH/EPDCCH/PHICH corresponds is allocated.

In a case where one primary cell is set, or in a case where one primary cell and one secondary cell are set and the first uplink reference UL-DL configuration for the primary cell and the first uplink reference UL-DL configuration for the secondary cell are the same, in each of the two serving cells, the corresponding first uplink reference UL-DL configuration is used to determine a correspondence between a subframe to which the PDCCH/EPDCCH/PHICH is allocated and a subframe to which the PUSCH to which the PDCCH/EPDCCH/PHICH corresponds is allocated.

In the case where one primary cell and one secondary cell are set and the first uplink reference UL-DL configuration for the primary cell and the first uplink reference UL-DL configuration for the secondary cell are different from each other, in each of the two serving cells, the corresponding second uplink reference UL-DL configuration is used to determine the correspondence between the subframe to which the PDCCH/EPDCCH/PHICH is allocated and the subframe to which the PUSCH to which the PDCCH/EPDCCH/PHICH corresponds is allocated.

FIG. 18 is a diagram illustrating a correspondence between the subframe n to which the PDCCH/EPDCCH/PHICH is allocated and the subframe n+k to which the PUSCH to which the PDCCH/EPDCCH/PHICH corresponds is allocated, according to the present embodiment. The mobile station device 1 specifies (selects or determines) a value k in accordance with a table in FIG. 18.

In FIG. 18, in the case where one primary cell is set, or in the case where one primary cell and one secondary cell are set and the first uplink reference UL-DL configuration for the primary cell and the first uplink reference UL-DL configuration for the secondary cell are the same, the uplink-downlink configuration refers to the first uplink reference UL-DL configuration.

In FIG. 18, in the case where one primary cell and one secondary cell are set and the first uplink reference UL-DL configuration for the primary cell and the first uplink reference UL-DL configuration for the secondary cell are different from each other, the uplink-downlink configuration refers to the second uplink reference UL-DL configuration.

The first uplink reference UL-DL configuration and the second uplink reference UL-DL configuration will be hereinafter referred to briefly as the uplink-downlink configuration when descriptions thereof are provided referring to FIG. 18.

In a case where, in the subframe n, the PDCCH/EPDCCH that is accompanied by an uplink grant that corresponds to the serving cell for which uplink-downlink configurations 1 to 6 are set, and that is destined for the mobile station device 1 is detected, the mobile station device 1 performs PUSCH transmission in accordance with the uplink grant in the subframe n+k that is specified (selected or determined) based on the table in FIG. 18.

In a case where, in the subframe n, the PHICH that is accompanied by the NACK that correspond to the serving cell for which the uplink-downlink configurations 1 to 6 are set, and that is destined for the mobile station device 1 is detected, the mobile station device 1 performs the PUSCH transmission in the subframe n+k that is specified (selected or determined) based on the table in FIG. 18.

A two-bit uplink index (UL index) is included in the uplink grant that corresponds to the serving cell for which the uplink-downlink configuration 0 is set and that is destined for the mobile station device 1. An uplink index (UL index) is not included in the uplink grant that corresponds to the serving cell for which the uplink-downlink configurations 1 to 6 are set and that is destined for the mobile station device 1.

In a case where, in the subframe n, a most significant bit (MSB) of the uplink index that is included in the uplink grant which corresponds to the serving cell for which the uplink-downlink configuration 0 is set is set to 1, the mobile station device 1 adjusts the PUSCH transmission in accordance with the uplink grant in the subframe n+k that is specified (selected or determined) based on the table in FIG. 18.

In a case where, in a first resource set in a subframe n=0 or 5, the PHICH that is accompanied by the NACK which corresponds to the serving cell for which the uplink-downlink configuration 0 is set is received, the mobile station device 1 adjusts the PUSCH transmission in accordance with the PHICH in the subframe n+k that is specified (selected or determined) based on the table in FIG. 18.

In a case where, in the subframe n, a least significant bit (LSB) of the uplink index that is included in the uplink grant which corresponds to the serving cell for which the uplink-downlink configuration 0 is set is set to 1, the mobile station device 1 adjusts the PUSCH transmission in accordance with the uplink grant in a subframe n+7 that is specified.

In a case where, in a second resource set in the subframe n=0 or 5, the PHICH that is accompanied by the NACK which corresponds to the serving cell for which the uplink-downlink configuration 0 is received, the mobile station device 1 adjusts the PUSCH transmission in accordance with the uplink grant in the subframe n+7.

In a case where, in a subframe n=1 or 6, the PHICH that is accompanied by the NACK which corresponds to the serving cell for which the uplink-downlink configuration 0 is set is received, the mobile station device 1 adjusts the PUSCH transmission in accordance with the uplink grant in the subframe n+7.

Furthermore, for example, in a case where in [SFN=m, subframe 1], the PDCCH/EPDCCH/PHICH that corresponds to the serving cell for which the uplink-downlink configuration 0 is set is detected, the mobile station device 1 performs the transmission of the PUSCH, in a subframe [SFN=m, subframe 7] that appears six subframes later.

The first uplink reference UL-DL configuration and the second uplink reference UL-DL configuration are used to specify (select or determine) a correspondence between the subframe n to which the PHICH is allocated and the subframe n–k to which the PUSCH to which the PHICH corresponds is allocated.

In the case where one primary cell is set, or in the case where one primary cell and one secondary cell are set and the first uplink reference UL-DL configuration for the primary cell and the first uplink reference UL-DL configuration for the secondary cell are the same, in each of the two serving cells, the corresponding first uplink reference UL-DL configuration is used to specify (select or determine) a correspondence between the subframe n to which the PHICH is allocated and the subframe n−k to which the PUSCH to which the PHICH corresponds is allocated.

In the case where one primary cell and one secondary cell are set and the first uplink reference UL-DL configuration for the primary cell and the first uplink reference UL-DL configuration for the secondary cell are different from each other, in each of the two serving cells, the corresponding second uplink reference UL-DL configuration is used to specify (select or determine) the correspondence between the subframe n to which the PHICH is allocated and the subframe n−k to which the PUSCH to which the PHICH corresponds is allocated.

FIG. 19 is a diagram illustrating the correspondence between the subframe n to which the PHICH is allocated, and the subframe n−k to which the PUSCH to which the PHICH corresponds is allocated, according to the present embodiment. The mobile station device 1 specifies (selects or determines) a value k in accordance with a table in FIG. 19.

In FIG. 19, in the case where one primary cell is set, or in the case where one primary cell and one secondary cell are set and the first uplink reference UL-DL configuration for the primary cell and the first uplink reference UL-DL configuration for the secondary cell are the same, the uplink-downlink configuration refers to the first uplink reference UL-DL configuration.

In FIG. 19, in the case where one primary cell and one secondary cell are set and the first uplink reference UL-DL configuration for the primary cell and the first uplink reference UL-DL configuration for the secondary cell are different from each other, the uplink-downlink configuration refers to the second uplink reference UL-DL configuration.

The first uplink reference UL-DL configuration and the second uplink reference UL-DL configuration will be hereinafter referred to briefly as the uplink-downlink configuration when descriptions thereof are provided referring to FIG. 19.

For the serving cell for which the uplink-downlink configurations 1 to 6 are set, in the subframe n, the HARQ indicator (the HARQ-ACK) that is received through the PHICH which corresponds to the serving cell relates to the PUSCH transmission in the subframe n−k that is specified based on the table in FIG. 19.

For the serving cell for which the uplink-downlink configuration 0 is set, in the first resource set in subframe n=0 or 5, in subframe n=1 or 6, the HARQ indicator (the HARQ-ACK) that is received through the PHICH which corresponds to the serving cell relates to the PUSCH transmission in the subframe n−k that is specified based on the table in FIG. 19.

For the serving cell for which the uplink-downlink configuration 0 is set, in the second resource set in subframe n=0 or 5, the HARQ indicator (the HARQ-ACK) that is received through the PHICH which corresponds to the serving cell relates to the PUSCH transmission in a subframe n−6.

For example, for the serving cell for which the uplink-downlink configuration 1 is set, in [SFN=m, subframe 1], the HARQ indicator (the HARQ-ACK) that is received through the PHICH relates to the PUSCH transmission in subframe [SFN=m−1, subframe 7] that appeared four subframes earlier.

The first uplink reference UL-DL configuration and the second uplink reference UL-DL configuration are used to specify (select or determine) a correspondence between the subframe n to which the PUSCH is allocated and the subframe n+k to which the PHICH to which the PUSCH corresponds is allocated.

In the case where one primary cell is set, or in the case where one primary cell and one secondary cell are set and the first uplink reference UL-DL configuration for the primary cell and the first uplink reference UL-DL configuration for the secondary cell are the same, in each of the two serving cells, the corresponding first uplink reference UL-DL configuration is used to specify (select or determine) a correspondence between the subframe n to which the PUSCH is allocated and the subframe n+k to which the PHICH to which the PUSCH corresponds is allocated.

In the case where one primary cell and one secondary cell are set and the first uplink reference UL-DL configuration for the primary cell and the first uplink reference UL-DL configuration for the secondary cell are different from each other, in each of the two serving cells, the corresponding second uplink reference UL-DL configuration is used to specify (select or determine) the correspondence between the subframe n to which the PUSCH is allocated and the subframe n+k to which the PHICH to which the PUSCH corresponds is allocated.

FIG. 20 is a diagram illustrating an example of a correspondence between the subframe n to which the PUSCH is allocated, and the subframe n+k to which the PHICH that the PUSCH corresponds to is allocated, according to the present embodiment. The mobile station device 1 specifies (selects or determines) a value of k in accordance with a table in FIG. 20.

In FIG. 20, in the case where one primary cell is set, or in the case where one primary cell and one secondary cell are set and the first uplink reference UL-DL configuration for the primary cell and the first uplink reference UL-DL configuration for the secondary cell are the same, the uplink-downlink configuration refers to the first uplink reference UL-DL configuration.

In FIG. 20, in the case where one primary cell and one secondary cell are set and the first uplink reference UL-DL configuration for the primary cell and the first uplink reference UL-DL configuration for the secondary cell are different from each other, the uplink-downlink configuration refers to the second uplink reference UL-DL configuration.

The first uplink reference UL-DL configuration and the second uplink reference UL-DL configuration will be hereinafter briefly referred to as the uplink-downlink configuration when descriptions thereof are provided referring to FIG. 20.

In a case where, in the subframe n, the PUSCH transmission is scheduled, the mobile station device 1 determines a PHICH resource in the subframe n+k that is specified from the table in FIG. 20.

For example, in a case where, for the serving cell for which the uplink-downlink configuration 0 is set, the PUSCH transmission is scheduled in [SFN=m, subframe n=2], the PHICH resource is determined in [SFN=m, subframe n=6].

The first downlink reference UL-DL configuration and the second downlink reference UL-DL configuration will be described in detail below.

The first downlink reference UL-DL configuration and the second downlink reference UL-DL configuration are used to specify (select or determine) the correspondence between the subframe n to which the PDSCH is allocated and the subframe n+k on which the HARQ-ACK that corresponds to the PDSCH is transmitted.

In the case where one primary cell is set, or in a case where one primary cell or one secondary cell is set and the downlink reference UL-DL configuration for the first primary cell and the first downlink reference UL-DL configuration for the secondary cell are the same, each of the two serving cells, the corresponding first downlink reference UL-DL configuration is used to specify (select or determine) the correspondence between the subframe n in which the PDSCH is arranged and the subframe n+k on which the HARQ-ACK corresponding to the PDSCH described above is transmitted.

In the case where one primary cell and one secondary cell are set and the first downlink reference UL-DL configuration for the primary cell and the first downlink reference UL-DL configuration for the secondary cell are different from each other, in each of the two serving cells, the corresponding second downlink reference UL-DL configuration is used to specify (select or determine) the correspondence between the subframe n to which the PDSCH is allocated and the subframe n+k on which the HARQ-ACK that corresponds to the PDSCH is transmitted.

FIG. 21 is a diagram illustrating an example of a correspondence between a subframe nk to which the PDSCH is allocated and the subframe n on which the HARQ-ACK to which the PDSCH corresponds is transmitted, according to the present embodiment. The mobile station device 1 specifies (selects or determines) a value k in accordance with a table in FIG. 21.

In FIG. 21, in the case where one primary cell is set, or in the case where one primary cell and one secondary cell are set and the first downlink reference UL-DL configuration for the primary cell and the first downlink reference UL-DL configuration for the secondary cell are the same, the uplink-downlink configuration refers to the first downlink reference UL-DL configuration.

In FIG. 21, in the case where one primary cell and one secondary cell are set and the first downlink reference UL-DL configuration for the primary cell and the first downlink reference UL-DL configuration for the secondary cell are different from each other, the uplink-downlink configuration refers to the second downlink reference UL-DL configuration.

The first downlink reference UL-DL configuration and the second downlink reference UL-DL configuration will be hereinafter briefly referred to as the uplink-downlink configuration when descriptions thereof are provided referring to FIG. 21.

In a case where, in the subframe n−k (k is specified by the table in FIG. 21) in the serving cell, the PDSCH transmission that has to perform the transmission of the corresponding HARQ-ACK that is destined for the mobile station device 1, the mobile station device 1 transmits the HARQ-ACK on the subframe n.

For example, the mobile station device 1 does not make a HARQ-ACK response to the PDSCH transmission that is used for transmission of the system information. For example, the mobile station device 1 makes the HARQ-ACK response to the PDSCH transmission that is scheduled by the DCI format which is accompanied by the CRC that is scrambled with the C-RNTI.

For example, in a subframe=2, the mobile station device 1 performs HARQ-ACK transmission in response to the PDSCH that is received on a subframe n−6 and/or n−7, in the serving cell for which the uplink-downlink configuration 1 is set.

Moreover, the first downlink reference UL-DL configuration may not be defined for the serving cell that does not receive the second information. In this case, the mobile station device 1 and the base station device 3 may perform processing that is performed based on the first downlink reference UL-DL configuration described above, based on the first uplink reference UL-DL configuration (the serving cell UL-DL configuration). The serving cell that does not receive the second information is a serving cell for which the timing TDD is not set.

For example, in a case where one primary cell and one secondary cell are set, the second information for the secondary cell is received without the second information for the primary cell being received, the first uplink reference UL-DL configuration (the serving cell UL-DL configuration) for the primary cell and the first downlink reference UL-DL configuration for the secondary cell are different from each other, and the serving cell is a secondary cell, the second downlink reference UL-DL configuration for the serving cell (the secondary cell) may be set based on the pair that is formed by the first uplink reference UL-DL configuration for a different serving cell (the primary cell) and the first downlink reference UL-DL configuration for the serving cell (the secondary cell).

For example, in a case where one primary cell and one secondary cell are set, the second information for the secondary cell is received without the second information for the primary cell being received, and the first uplink reference UL-DL configuration (the serving cell UL-DL configuration) for the primary cell and the first downlink reference UL-DL configuration for the secondary cell are different from each other, in each of the two serving cell, the corresponding second downlink reference UL-DL configuration may be used to specify (select or determine) the correspondence between the subframe n to which the PDSCH is allocated and the subframe n+k on which the HARQ-ACK that corresponds to the PDSCH is transmitted.

For example, in a case where one primary cell and one secondary cell are set, the second information for the secondary cell is received without the second information for the primary cell being received, and the first uplink reference UL-DL configuration (the serving cell UL-DL configuration) for the primary cell and the first downlink reference UL-DL configuration for the secondary cell are the same, in the primary cell, the corresponding first uplink reference UL-DL configuration (the serving cell UL-DL configuration) may be used to specify (select or determine) the correspondence between the subframe n to which the PDSCH is allocated and the subframe n+k to which the HARQ-ACK that corresponds to the PDSCH is transmitted, and, in the secondary cell, the first downlink reference UL-DL configuration may be used to specify (select or determine) the correspondence between the subframe n to which the PDSCH is allocated and the subframe n+k on which the HARQ-ACK that corresponds to the PDSCH is transmitted.

For example, in the case where one primary cell and one secondary cell are set, the second information for the secondary cell is received without the second information for the primary cell being received, the first uplink reference UL-DL configuration (the serving cell UL-DL configuration) for the primary cell and the first downlink reference UL-DL configuration for the secondary cell are different from each other, in FIGS. 12 and 14, the primary cell UL-DL configuration refers to the first uplink reference UL-DL configuration for the primary cell.

The CSI will be described in detail below.

The CSI includes a channel quality indicator (CQI), a rank indicator (RI), and a precoding matric indicator (PMI). The CQI expresses a combination of a modulation scheme and a coding rate for a single transport block that is transmitted on the PDSCH. The coding rate is derived from an amount of resources for the PDSCH and a size of a transport block.

Figures 22, 23:
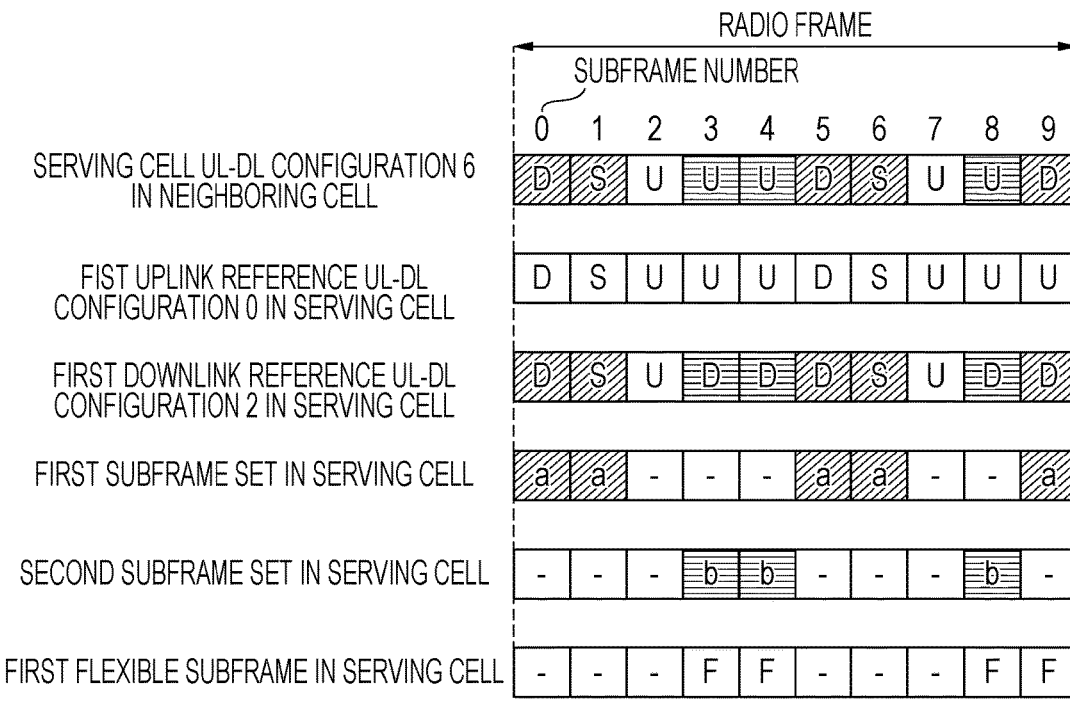
FIG. 22 is a table illustrating a modulation scheme and a coding rate that correspond to a CQI index according to the present embodiment.
FIG. 23 is a diagram illustrating one example of a configuration of a subframe set according to the present embodiment.

FIG. 22 is a table illustrating the modulation scheme and the coding rate that correspond to a CQI index according to the present embodiment. The mobile station device 1 derives the highest CQI index from 1 to 15 in the table in FIG. 22, which satisfies a condition that a CQI index is transmitted in a group of downlink physical resource blocks that are referred to as CSI reference resources and is then received with the probability of a transport block error that a single PDSCH transport block which is a combination of the modulation scheme and the transport block size that correspond to the CQI index will not exceed 0.1. In a case where the CQI index 1 does not satisfy the condition described above, the mobile station device 1 derives CQI index 0.

However in a case where UL-DL configurations of a neighboring cell and a serving cell are different from each other, an interference state differs for one subframe to another. Then, according to the present embodiment, at least two subframe sets are defined, and the mobile station device 1 reports to the base station device 3 the channel state information for each of at least two subframe sets. Moreover, a subframe set is preferably configured based on the interference state of the subframe.

FIG. 23 is a diagram illustrating one example of a configuration of the subframe set according to the present embodiment. In FIG. 23, D denotes a downlink subframe, U denotes an uplink subframe, S denotes a special subframe, a denotes a subframe that belongs to a first subframe set, b denotes a subframe that belongs to a second subframe set, and F denotes a first flexible subframe.

In FIG. 23, the downlink transmission is performed with subframes {0, 1, 3, 4, 5, 6, 8, 9} in the serving cell. Furthermore, in FIG. 23, the downlink transmission is performed with subframes {0, 1, 5, 6, 9} in a neighboring cell, and the uplink transmission is performed with subframes {3, 4, 8} in the neighboring cell. Therefore, in the serving cell, the interference state differs between subframes {0, 1, 5, 6, 9} and subframes {3, 4, 8}. Accordingly, in FIG. 23, the first subframe set is configured from subframes {0, 1, 5, 6, 9} and the second subframe set is configured from subframes {3, 4, 8}.

The base station device 3 transmits information showing the subframe set to the mobile station device 1, and the mobile station device 1 may configure the subframe set based on the information.

Moreover, the subframe set may be implicitly configured based on the first flexible subframe. For example, the first subframe set may be configured from the first flexible subframes, and the second subframe set may be configured from the downlink subframes that results from the first uplink reference UL-DL configuration, or from the subframes that are indicated as the special subframes.

Moreover, multiple CSI processes may be set for the mobile station device 1. At least two subframe sets may be for a single CSI process. Furthermore, at least two CSI processes may be set for the mobile station device 1, and one subframe set may be configured for each of at least two CSI processes.

The mobile station device 1 may derive CSI for each of the multiple CSI processes and/or the multiple subframe sets and may report the CIS.

Moreover, the special subframe that includes a DwPTS that is equal in length to or less than 7680/(15000×2048) seconds may belong to none of the subframe sets.

The reporting of the CSI is performed periodically or aperiodically. The CSI that is periodically reported is referred to as periodic CSI. The CSI that is aperiodically reported is referred to as aperiodic CSI.

A resource that is used for the reporting of the CSI by the mobile station device 1 is controlled by the base station device 3.

The mobile station device 1 is semi-statically set by the higher layer (the RRC layer) in such a manner that the periodic CSI is periodically fed back through the PUCCH. To be more precise, the mobile station device 1 sets the subframe that is used for the reporting of the periodic CSI is reported, using the higher layer (the RRC layer). The mobile station device 1 may set the reporting of the periodic CSI, using every CSI process and/or every subframe set.

The aperiodic CSI is transmitted on the PUSCH. In a case where an uplink grant is detected in the subframe n for the serving cell c, and a CSI request field that is included in the uplink grant is set in such a manner as to trigger the CSI reporting, the mobile station device 1 performs the reporting of the aperiodic CSI using the PUSCH that is scheduled by the uplink grant in the subframe n+k in the serving cell c.

Information (a CSI request) showing whether or not to instruct the mobile station device 1 to perform the reporting of the aperiodic CSI is mapped to the CSI request field. Furthermore, the information indicates the CSI process, and/or the subframe set, and then the mobile station device 1 may report the aperiodic CSI for each of the CSI process and/or the subframe set that is indicated by the information.

The mobile station device 1 derives wideband CQI, and subband CQI. In the frequency domain, the wideband CQI corresponds to all the downlink physical resource blocks, and the subband CQI corresponds to some of the downlink physical resource blocks.

The CSI reference resource will be described below.

In the frequency domain, the CSI reference resource is defined by a group of physical resource blocks that correspond to a band to which a value of the CQI that is derived relates.

In the time domain, the CSI reference resource is defined by one subframe. In a case where the CSI is reported in the subframe n, the CSI reference resource is defined by a subframe $n-n_{CQIref}$ For example, in a case where the CSI is reported in the subframe n, $n_{CQIref}$ is the smallest value that is equal to or greater than m, in such a manner that subframe $n-n_{CQIref}$ correspond to a valid subframe. For example, m is 4 or 5. For example, in a case where the aperiodic CSI is reported, the CSI reference resource a valid subframe that receives the corresponding CSI request.

The mobile station device 1 regards the subframe that satisfies at least the following conditions, as being valid. Moreover, the UL-DL configuration that is shows by the first information is referred to as the UL-DL configuration of the serving cell.

Condition (X1): In a case where the transmission direction UL-DL configuration is not set, a valid subframe is not indicated, as the downlink subframe, by the UL-DL configuration of the serving cell.

Condition (X2): In a case where the transmission direction UL-DL configuration is set, a valid subframe is indicated, as the downlink subframe, by the transmission direction UL-DL configuration.

Condition (X3): In a case where transmission modes 9 and 10 are not available, a valid subframe is not an MBSFN subframe.

Condition (X4): A valid subframe does not include a DwPTS field that is equal to or less than 7680/(15000×2048) seconds in length.

Condition (X5): A valid subframe is not included in a measurement gap that is set for the mobile station device 1.

Condition (X6): In a case where the subframe set is configured for the mobile station device 1, a valid subframe is an element of the subframe set to which the CSI reporting corresponds.

Moreover, in condition (X1) and condition (X2), the downlink subframe includes the special subframe.

Moreover, in a case where multiple cells with different UL-DL configurations are aggregated and the mobile station device 1 has not an ability to perform the transmission and the reception at the same time in the aggregated cells, in conditions (X1) and condition (X2), the downlink subframes include the downlink subframe for the primary cell and the special subframe that includes the DwPTS field which is greater than 7680/(15000×2048) seconds in length.

Moreover, any one of the CSI reference resource for a certain serving cell belongs to one subframe set, and does not belong to multiple subframe sets.

Accordingly, the base station device 3 can control the subframe that is specified, as the CSI reference resource, by the mobile station device 1, using the third information.

Moreover, in a case where a valid subframe is not available for the CSI reference resource, the mobile station device 1 may omit the CSI reporting.

The mobile station device 1 in the transmission modes 1 to 8 performs the channel measurement based on the CRS in order to derive the CQI relating to the CSI reference resource.

The mobile station device 1 in the transmission modes 9 and 10 performs the channel measurement using a NZP CSI-RS resource that corresponds to the CSI process, in order to derive the CQI relating to the CSI reference resource. The NZP CSI-RS resource may be set for every CSI process.

The mobile station device 1 in the transmission mode 10 performs interference measurement using a CSI-IM resource that corresponds to the CSI process, in order to derive the CQI relating to the CSI reference resource. In a case where at least two subframe sets are configured for a single CSI process, the mobile station device 1 in the transmission mode 10 performs the interference measurement using the CSI-IM resource within the subframe set to which the CSI reference resource belongs, in order to derive the CQI relating to the CSI reference resource.

In LTE, the transmission mode is controlled by the base station device 3.

The base station device 3 transmits fourth information relating to the first subframe set, and the fourth information relating to the second subframe set to the mobile station device 1. When, in the CSI reference resource, the number of resource elements that correspond to the CRS is 0 and the number of OFDM symbols that are occupied by a control signal which includes the PDCCH is 0, the fourth information is used to indicate whether or not the mobile station device 1 makes an assumption.

Moreover, when, in the CSI reference resource, the number of resource elements that correspond to the CRS is 0 and the number of OFDM symbols that are occupied by a control signal which includes the PDCCH is 0, the fourth information may be used to indicate that the mobile station device 1 makes an assumption.

Moreover, in the CSI reference resource, the fourth information may be used to indicate only that the number of resource elements which correspond to the CRS is 0. In the CSI reference resource, the fourth information may be used to indicate only that the number of OFDM symbols that are occupied by the control signal which includes the PDCCH is 0.

The mobile station device 1 sets the fourth information.

The base station device 3 transmits fifth information for the first subframe set and the fifth information for the second subframe set to the mobile station device 1. The fifth information shows a value of a $P_A$. The $P_A$ may be set dedicatedly for every CSI process and for every subframe set.

The base station device 3 transmits sixth information (nomPDSCH-RS-EPRE-Offset) for the first subframe set and the second subframe set to the mobile station device 1. The sixth information shows $\Delta_{offset}$. $\Delta_{offset}$ may be common to multiple CSI processes and multiple subframe sets.

In a case where the CRS is used for the channel measurement, for the purpose of deriving the CQI index, the mobile station device 1 derives a ratio between PDSCH energy per resource element (EPRE) and CRS EPRE that is assumed in the CSI reference resource, using at least the $P_A$ and $\Delta_{offset}$.

The base station device 3 transmits seventh information showing a ratio $\rho_A/\rho_B$ between PDSCH EPRE in the OFDM symbol that does not include the CRS and PDSCH EPRE in the OFDM symbol that includes the CRS, to the mobile station device 1. $\rho_A/\rho_B$ may be common to multiple subframe sets. $\rho_A/\rho_B$ may be common to multiple CSI processes and may differ.

The base station device 3 transmits eighth information for each of the CSI process and/or the subframe set to the mobile station device 1. The eighth information shows a ratio ($P_e$) between PDSCH EPRE and NZP CSI-RS EPRE.

The base station device 3 transmits ninth information showing CRS EPRE to the mobile station device 1.

The base station device 3 may transmit each of the pieces of fourth information to ninth information, in a state of being included in information of the higher layer (the system information message and/or the RRC message).

For the purpose of deriving the CQI index, the mobile station device 1 makes at least one of the following assumptions in the CSI reference resource.

Assumption (1): When, with the fourth information, the number of resource elements that correspond to the CRS is 0 in the CSI reference resource, in a case where it is indicated that the mobile station device 1 makes an assumption (in a case where the fourth information is set), the mobile station device 1 assumes that the number of resource elements that correspond to the CRS is 0.

Assumption (2): When, with the fourth information, the number of resource elements that correspond to the CRS is 0 in the CSI reference resource, in a case where it is indicated that the mobile station device 1 does not make an assumption (in a case where the fourth information is not set), the mobile station device 1 assumes that the number of resource elements that correspond to the CRS is the same as that within non-MBSFN subframe.

Assumption (3): When, with the fourth information, the number of OFDM symbols that are occupied by the control signal which includes the PDCCH is 0 in the CSI reference resource, in the case where it is indicated that the mobile station device 1 makes an assumption (in the case where the fourth information is set), the mobile station device 1 assumes that the number of OFDM symbols that are occupied by the control signal which includes the PDCCH is 0.

Assumption (4): When, with the fourth information, the number of OFDM symbols that are occupied by the control signal which includes the PDCCH is 0 in the CSI reference resource, in the case where it is indicated that the mobile station device 1 does not make an assumption (in the case where the fourth information is not set), the mobile station device 1 assumes that the number of OFDM symbols that are occupied by the control signal which includes the PDCCH is 3.

Assumption (5): in a case where the NZP CSI-RS is used for the channel measurement, the mobile station device 1 assumes the CSI process and/or the ratio between PDSCH EPRE and NZP CSI-RS EPRE that is given by $P_e$ which corresponds to the subframe set. Moreover, the ratio between the PDSCH EPRE and CRS EPRE is given by $P_A$.

Assumption (6): In a case where the CRS is used for the channel measurement, the mobile station device 1 assumes $\Delta_{offset}$ that is common to the subframe sets and the ratio between PDSCH EPRE and CRS EPRE that is given by $P_A$ which corresponds to the subframe set.

Assumption (7): A resource element may be used by the synchronization signal, the PBCH, or the EPDCCH.

Assumption (8): A CP length of non-MBSFN subframe.

Assumption (9): Redundancy version 0.

Assumption (10): An element resource that is allocated to the NZP CSI-RS and the ZP CSI-RS is not available.

Assumption (11): An element that is allocated to the PRS is not available.

Assumption (12): A PDSCH transmission scheme in accordance with the transmission mode that is currently set for the mobile station device 1.

Figure 24:
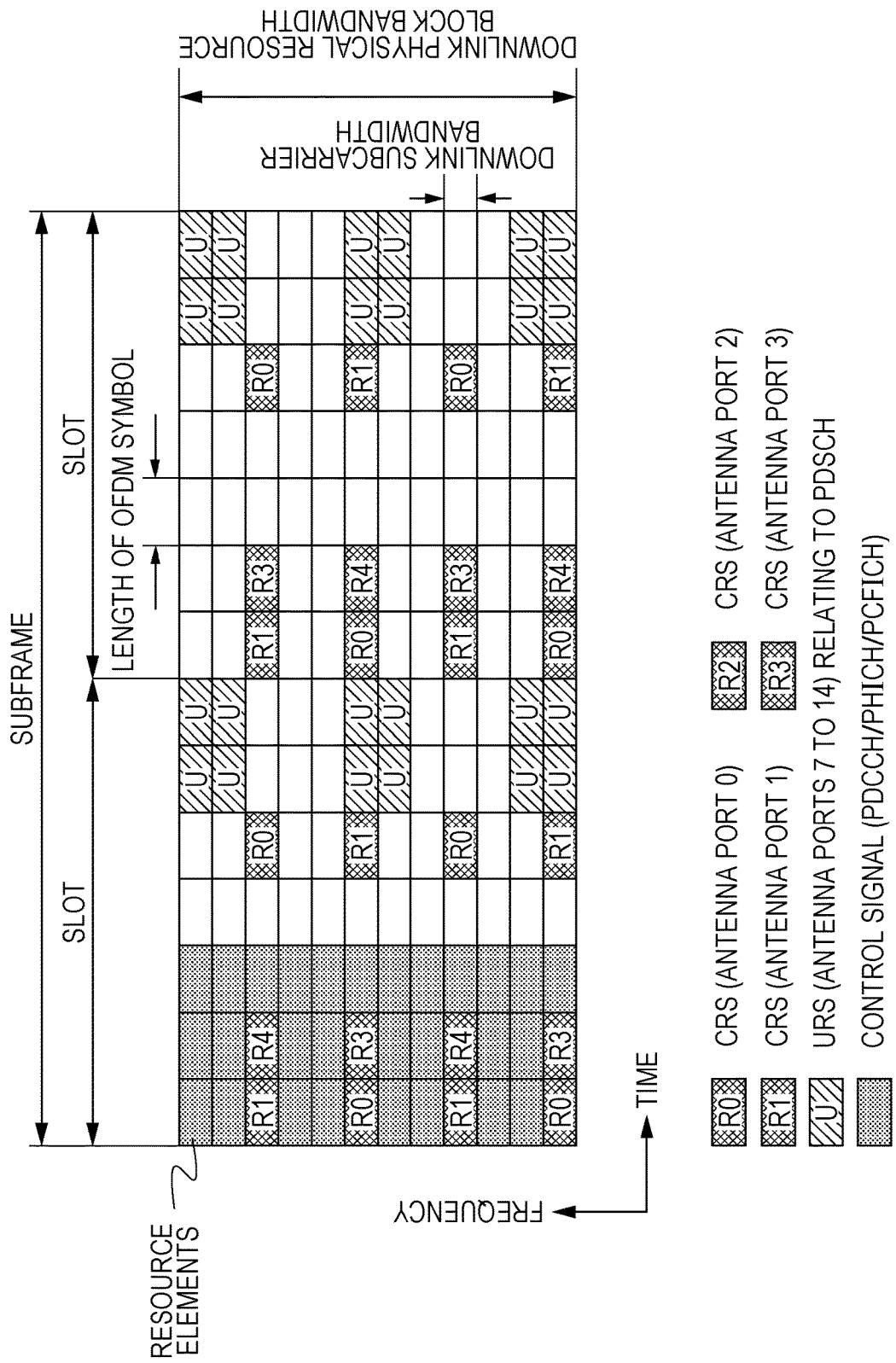
FIG. 24 is a diagram illustrating one example of mapping of a URS, a CRS, and a control signal (PDCCH/PHICH/PCFICH) according to the present embodiment.

FIG. 24 is a diagram illustrating one example of the mapping of the URS, the CRS, and the control signal (the PDCCH/PHICH/PCFICH) according to the present embodiment. In FIG. 24, the horizontal axis is a time axis and the vertical axis is a frequency axis. When, with the fourth information in the CSI reference resource, the number of resource elements that correspond to the CRS is 0 and the number of OFDM symbols that are occupied by the control signal which includes the PDCCH is 0, in a case where it is not indicated that an assumption is made, the mobile station device 1 assumes overhead of the URS, the CRS and the control signal in Fig. 24 in the CSI reference resource.

Figure 25:
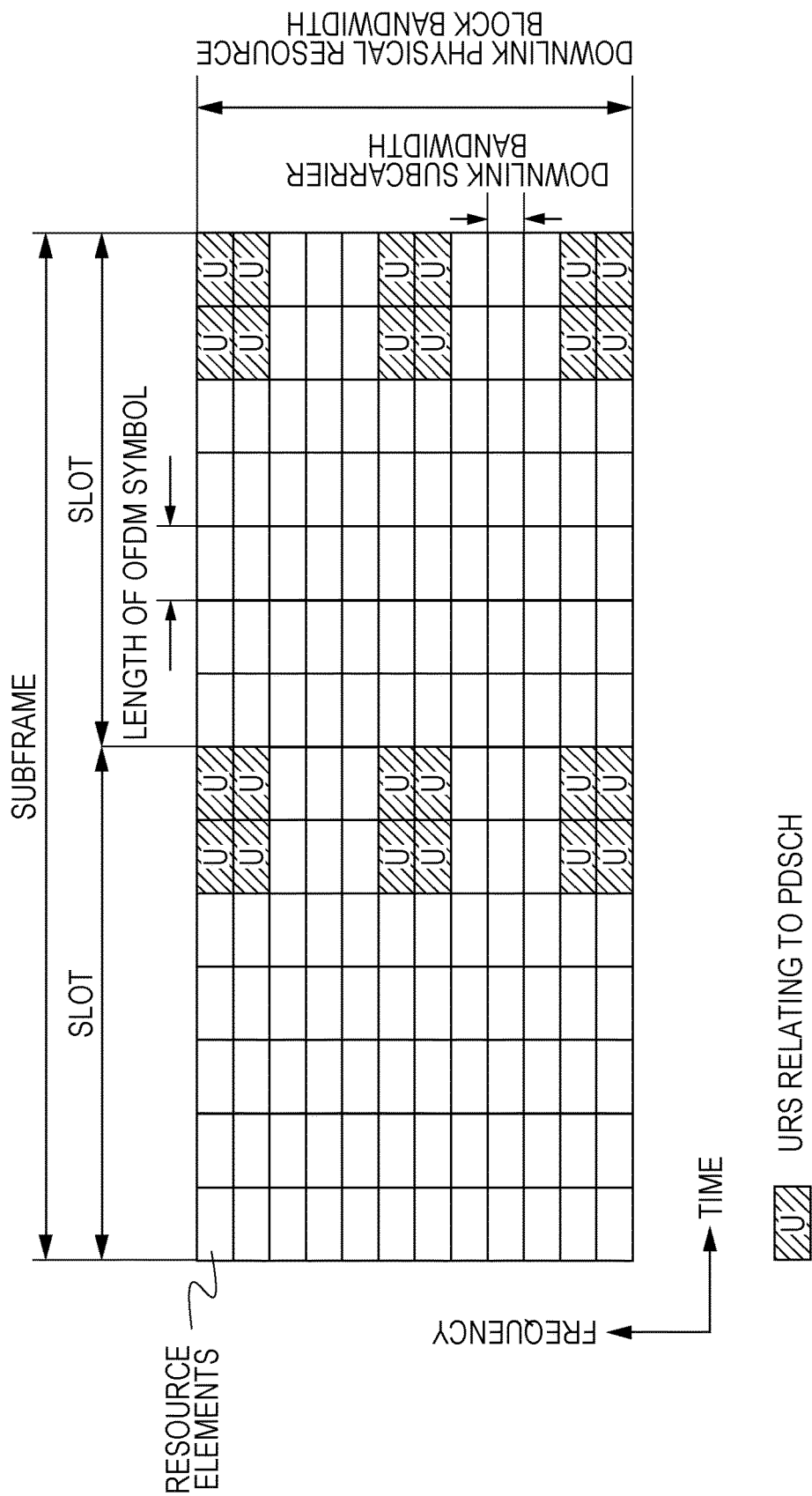
FIG. 25 is a diagram illustrating one example of the mapping of the URS according to the present embodiment.

FIG. 25 is a diagram illustrating one example of the mapping of the URS according to the present embodiment. In FIG. 25, the horizontal axis is a time axis and the vertical axis is a frequency axis. When, with the fourth information in the CSI reference resource, the number of resource elements that correspond to the CRS is 0 and the number of OFDM symbols that are occupied by the control signal which includes the PDCCH is 0, in a case where it is indicated that an assumption is made, the mobile station device 1 assumes the overhead of the URS, the CRS and the control signal in Fig. 25 in the CSI reference resource.

Moreover, the overhead of the CRS in assumption (1) and assumption (2) may be different from actual overhead of the CRS. Moreover, the overhead of the control signal (the PDCCH/PCFICH/PHICH) in assumption (3) and assumption (4) may be different from actual overhead of the control signal (the PDCCH/PCFICH/PHICH). For example, the actual overhead of the control signal is derived by information that is transmitted through the PCFICH and that indicates a region (an OFDM symbol) that is used for the transmission of the PDCCH.

For example, in FIG. 23, when, in the CSI reference resource that belongs to the first subframe set, the number of resource elements that correspond to the CRS is not 0 and the number of OFDM symbols that are occupied by the control signal which includes the PDCCH is not 0, the base station device 3 may desirably instruct the mobile station device 1 to make an assumption. For example, in FIG. 23, the first flexible subframe, in which the number of resource elements that correspond to the CRS is 0 and the number of OFDM symbols that are occupied by the control signal which includes the PDCCH is 0, may be included in the first subframe set.

For example, in FIG. 23, in a case where the CRS, the PDCCH, the PHICH, and/or the PCFICH is set to be transmitted on the first flexible subframe that is indicated, as the downlink subframe, by the transmission direction UL-DL configuration, when, in the CSI reference resource that belongs to the second subframe set, the number of resource elements that correspond to the CRS is not 0 and the number of OFDM symbols that are occupied by the control signal which includes the PDCCH is not 0, the base station device 3 desirably instructs the mobile station device 1 to make an assumption.

For example, in FIG. 23, in a case where the CRS, the PDCCH, the PHICH, and/or the PCFICH is set not to be transmitted on the first flexible subframe that is indicated, as the downlink subframe, by the transmission direction UL-DL configuration, when, in the CSI reference resource that belongs to the second subframe set, the number of resource elements that correspond to the CRS is 0 and the number of OFDM symbols that are occupied by the control signal which includes the PDCCH is 0, the base station device 3 desirably instructs the mobile station device 1 to make an assumption.

Moreover, a ratio between PDSCH EPRE and NZP CSI-RS EPRE in assumption (5) may be different from an actual ratio between PDSCH EPRE and NZP CSI-RS EPRE. Moreover, a ratio between PDSCH EPRE and CRS EPRE assumption (6) may be different from an actual rate between PDSCH EPRE and CRS EPRE.

(i) According to an aspect of the present embodiment, there is provided a base station device 3 that communicates with a mobile station device 1, the base station device 3 including a transmission unit that transmits pieces of information that shows a first subframe set and a second subframe set, information that shows a first value for calculating a ratio between power (PDSCH EPRE) for every resource element to which a physical downlink shared channel corresponds and power (CRS EPRE) for every resource element to which a cell-specific reference signal corresponds, which is assumed by the mobile station device 1 to derive a channel quality indicator (CQI) in a channel state information (CSI) reference resource that belongs to the first subframe set, and information that shows a second value for calculating the ratio between the power (PDSCH EPRE) for every resource element to which the physical downlink shared channel corresponds and the power (CRS EPRE) for every resource element to which the cell-specific reference signal corresponds, which is assumed by the mobile station device 1 to derive a channel quality indicator (CQI) in a channel state information (CSI) reference resource that belongs to the second subframe set.

(ii) Furthermore, according to the aspect of the present embodiment, the transmission unit of the base station device 3 transmits information showing a third value for calculating the ratio between the power (PDSCH EPRE) for every resource element to which the physical downlink shared channel corresponds and the power (CRS EPRE) for every resource element to which the cell-specific reference signal corresponds, which is assumed by the mobile station device 1 to derive a channel quality indicator (CQI) in a channel state information (CSI) reference resource, in which the third value is common to the first subframe set and the second subframe set.

(iii) Furthermore, according to the aspect of the present embodiment, the transmission unit of the base station device 3 transmits information that is used to show whether the mobile station device 1 makes an assumption, for each of the first subframe set and the second subframe set, when, in the channel state information (CSI) reference resource, the number of resource elements that correspond to the cell specific reference signal (CRS) is 0 and/or the number of OFDM symbols that are occupied by a control signal which includes the physical downlink control channel (PDCCH) is 0.

(iv) Furthermore, the base station device 3 according to the aspect of present embodiment includes a reception unit that receives the channel quality indicator (CQI) that corresponds to the channel state information (CSI) reference resource which belongs to the first subframe set, and a channel quality indicator (CQI) that corresponds to the channel state information (CSI) reference resource which belongs to the second subframe set, (v) Furthermore, according to another aspect of the present embodiment, there is provided a mobile station device 1 that communicates with a base station device 3, the mobile station device 1 including a reception unit that receives: pieces of information that shows a first subframe set and a second subframe set, information that shows a first value for calculating a ratio between power (PDSCH EPRE) for every resource element to which a physical downlink shared channel corresponds and power (CRS EPRE) for every resource element to which a cell-specific reference signal corresponds, which is assumed by the mobile station device 1 to derive a channel quality indicator (CQI) in a channel state information (CSI) reference resource that belongs to the first subframe set, and information that shows a second value for calculating the ratio between the power (PDSCH EPRE) for every resource element to which the physical downlink shared channel corresponds and the power (CRS EPRE) for every resource element to which the cell-specific reference signal corresponds, which is assumed by the mobile station device 1 to derive a channel quality indicator (CQI) in a channel state information (CSI) reference resource that belongs to the second subframe set, pieces of information that indicates a first subframe set and a second subframe set, information that indicates a first value for calculating a ratio between power (PDSCH EPRE) for every resource element to which a physical downlink shared channel corresponds and power (CRS EPRE) for every resource element to which a cell-specific reference signal corresponds, which is assumed by the mobile station device 1 to derive a channel quality indicator (CQI) in a channel state information (CSI) reference resource that belongs to the first subframe set, and information that indicates a second value for calculating the ratio between the power (PDSCH EPRE) for every resource element to which the physical downlink shared channel corresponds and the power (CRS EPRE) for every resource element to which the cell-specific reference signal corresponds, which is assumed by the mobile station device 1 to derive a channel quality indicator (CQI) in a channel state information (CSI) reference resource that belongs to the second subframe set.

(vi) Furthermore, according to the aspect of the present embodiment, the reception unit of the mobile station device 1 receives information showing a third value for calculating the ratio between the power (PDSCH EPRE) for every resource element to which the physical downlink shared channel corresponds and the power (CRS EPRE) for every resource element to which the cell-specific reference signal corresponds, which is assumed by the mobile station device 1 to derive a channel quality indicator (CQI) in a channel state information (CSI) reference resource, in which the third value is common to the first subframe set and the second subframe set.

(vii) Furthermore, according to the aspect of the present embodiment, the reception unit of the mobile station device 1 receives information that is used to show whether the mobile station device 1 makes an assumption, for each of the first subframe set and the second subframe set, when, in the channel state information (CSI) reference resource, the number of resource elements that correspond to the cell specific reference signal (CRS) is 0 and/or the number of OFDM symbols that are occupied by a control signal which includes the physical downlink control channel (PDCCH) is 0.

(viii) Furthermore, the mobile station device 1 according to the aspect of the present embodiment further includes a control unit that specifies the channel state information (CSI) reference resource; and a measurement unit that derives the channel quality indicator (CQI) relating to the channel state information (CSI) reference resource, based on the assumption for the first subframe set or the second subframe set to which the channel state information (CSI) reference resource belongs.

(ix) Furthermore, according to the aspect of the embodiment, in a case where the channel state information (CSI) reference resource is defined by a single subframe that satisfies at least the following conditions, in a time domain, and the UL-DL configuration (the transmission direction UL-DL configuration) is set based on control information (third information) that is transferred on the physical downlink control channel (PDCCH) and/or an EPDCCH, the conditions include a condition that a subframe which is indicated, as the downlink subframe, by the UL-DL configuration (the transmission direction UL-DL configuration) that is set by the control information (the third information) is present.

(x) Furthermore, according to the present embodiment, in a case where the UL-DL configuration (the transmission direction UL-DL configuration) is not set based on the control information (the third information) that is transferred on the physical downlink control channel (PDCCH) and/or the EPDCCH, the conditions include a condition that a subframe which is indicated, as the downlink subframe, by the UL-DL configuration of a serving cell.

(xi) Furthermore, according to the present embodiment, the downlink subframe that is specified the channel state information (CSI) reference resource includes a special subframe that includes a DwPTS field which greater than $7680/(15000 \times 2048)$ seconds in length.

(xii) Furthermore, the mobile station device 1 according to the aspect of the present embodiment further includes a measurement unit that derives the index of the channel quality indicator, based on the channel state information reference resource, for a value of the channel quality indicator that is reported in a subframe n and a transmission unit that reports the channel state information that is made up of the channel quality indicator in the subframe n. In the time domain, the channel state information reference resource is defined by one subframe n−nCQI_ref. For the periodic reporting of the channel state information, the nCQI_ref is the smallest value that is equal to or greater than 4, in such a manner as to correspond to a subframe for which the subframe n−nCQI_ref is valid. A subframe in a certain serving cell that satisfies references which include at least some or all of the following references (i) to (v) is regarded as being valid.

Reference (i): For a radio frame for the serving cell, the subframe is a subframe that is indicated, as the downlink subframe or the special subframe, by the uplink-downlink configuration for the radio frame for the serving cell.

Reference (ii): In a case where a length of the downlink pilot time slot (DwPTS) is a prescribed value or is shorter than the prescribed value, the subframe does not include the DwPTS field.

Reference (iii): For the transmission modes 1 to 8, the subframe is not a multimedia broadcast and multicast service over single frequency network (MBSFN) subframe.

Reference (iv): The subframe does not fall within a measurement gap that is set for the terminal device.

Reference (v): In a case where, for the periodic reporting of the channel state information, a subframe set relating to the channel state information is configured, the subframe is an element of a subframe set that is linked to the periodic reporting of the channel state information.

In the reference (i), in a case where information on which signaling is performed with the physical downlink control channel and that shows the uplink-downlink configuration for the radio frame for the serving cell is detected, the uplink-downlink configuration for the radio frame for the serving cell is given by information that shows the uplink-downlink configuration for the radio frame for the serving cell.

In the reference (i), in a case where the information that shows the uplink-downlink configuration for the radio frame for the serving cell is not detected, the uplink-downlink configuration for the radio frame for the serving cell is the same as the uplink-downlink configuration that is indicated by a parameter of a higher layer.

(xiii) Furthermore, the mobile station device 1 according to the present embodiment regards a subframe in a certain serving cell that satisfies references which include at least some or all of the following references (vi) to (xi), as being valid.

Reference (vi): In a case where multiple cells that are accompanied by different uplink-downlink configurations are aggregated, and the terminal device cannot perform transmission and reception in the aggregated multiple cells at the same time, a subframe in a primary cell is a downlink subframe or a special subframe that is indicated by the uplink-downlink configuration for the radio frame for the primary cell.

Reference (vii): In the radio frame for the cell, the subframe is a subframe that is indicated as a downlink subframe or a special subframe by the uplink-downlink configuration for the radio frame for the cell.

Reference (viii): For the transmission modes 1 to 8, the subframe is not a multimedia broadcast and multicast service over single frequency network (MBSFN) subframe.

Reference (ix): In a case where the length of the DwPTS is equal to or shorter than the prescribed value, the subframe does not include the downlink pilot time slot (DwPTS).

Condition (x): The subframe does not fall within the measurement gap that is set for the terminal device.

Condition (xi): For the periodic reporting of the channel state information, in the case where the subframe set relating to the channel state information is set, the subframe is an element of the subframe set that is linked to the periodic reporting of the channel state information.

In the references (vi) and the reference (vii), in a case where information on which signaling is performed with the physical downlink control channel and that shows the uplink-downlink configuration for the radio frame for the cell (the primary cell and the secondary cell) is detected, the uplink-downlink configuration for the radio frame for the cell is an uplink-downlink configuration that is shown by the information which shows the uplink-downlink configuration for the radio frame for the cell.

In the references (vi) and the reference (vii), in a case where the information that shows the uplink-downlink configuration for the radio frame for the cell (the primary cell and the secondary cell) is not detected, the uplink-downlink configuration for the radio frame for the cell is an uplink-downlink configuration that is indicated by the parameter of the higher layer. The aggregated multiple cells include one of the primary cells.

Accordingly, in a wireless communication system in which the channel state information is used, the base station device 3 can efficiently communicate with the mobile station device 1.

A program running on the base station device 3 and the mobile station device 1 according to the present invention may be a program (a program for causing a computer to operate) that controls a central processing unit (CPU) and the like in such a manner as to realize the functions according to the embodiments of the present invention, which are described above. Then, the information that is handled in these devices is temporarily stored in a Random Access Memory (RAM) while being processed. Thereafter, the information is stored in various types of ROM such as a Flash Read Only Memory (ROM) or a Hard Disk Drive (HDD) and, whenever necessary, is read by the CPU to be modified or rewritten.

Moreover, one portion of each of the mobile station device 1 and the base station device 3 according to the embodiments, which are described above, may be realized by the computer. In that case, this one portion may be realized by recording a program for realizing such control functions on a computer-readable medium and causing a computer system to read the program stored on the recording medium for execution.

Moreover, the "computer system" here is defined as a computer system built into the mobile station device 1 or the base station device 3 and as including an OS or hardware components such as a peripheral device. Furthermore, the "computer-readable recording medium" refers to a portable medium such as a flexible disk, a magneto-optical disk, a ROM, and a CD-ROM, and a storage device such as a hard disk that is built into the computer system.

Moreover, the "computer-readable recording media" may include a medium that dynamically retains the program for a short period of time, such as a communication line that is used when transmitting the program over a network such as the Internet or over a communication circuit such as a telephone circuit and a medium that retains the program for a fixed period of time, such as a volatile memory within the computer system, which functions as a server or a client in a case of including the program dynamically. Furthermore, the program may be one for realizing some of the functions described above and additionally may be one that can realize the functions described above in combination with a program that is already recorded on the computer system.

Furthermore, the base station device 3 according to the embodiments, which are described above, can be realized as an aggregation (a device group) that is configured from multiple devices. Each device that makes up the device group may be equipped with some portion of or all portions of each function or each functional block of the base station device 3 according to the embodiment, which is described. The device group itself may have each general function or each general functional block of the base station device 3. Furthermore, the mobile station device 1 according to the embodiments, which are described, can also communicate with the base station device as the aggregation.

Furthermore, the base station device 3 according to the embodiment, which is described, may be an evolved universal terrestrial radio access network (E-UTRAN). Furthermore, the base station device 3 according to the embodiment, which is described, may have some portions of or all portions of a function of a higher node above an eNodeB.

Furthermore, some portions of or all portions of each of the mobile station device 1 and the base station device 3 according to the embodiment, which are described, may be realized as an LSI that is a typical integrated circuit and may be realized as a chip set. Each functional block of each of the mobile station device 1 and the base station device 3 may be individually realized as a chip, and some of, or all of the functional blocks may be integrated into a chip. Furthermore, a circuit integration technique is not limited to the LSI, and an integrated circuit for the functional block may be realized with a dedicated circuit or a general-purpose processor. Furthermore, if with advances in a semiconductor technology, a circuit integration technology with which an LSI is replaced appears, it is also possible to use an integrated circuit to which such a technology is applied.

Furthermore, according to the embodiments, as described above, the mobile station device is described as one example of a terminal device or a communication device, but the present invention is not limited to this, and can be applied also to a terminal apparatus or a communication apparatus, such as a fixed-type electronic apparatus that is installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The embodiments of the invention are described in detail above referring to the drawings, but the specific configuration is not limited to the embodiments and includes an amendment to a design that falls within the scope that does not depart from the gist of the present invention.

Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to each of the embodiments is also included in the technical scope of the present invention.

DESCRIPTION OF REFERENCE NUMERALS 1 (1A, 1B, 1C) MOBILE STATION DEVICE
3 BASE STATION DEVICE
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL UNIT
1013 SUBFRAME SETTING UNIT
1015 SCHEDULING INFORMATION INTERPRETATION UNIT
1017 CSI REPORT CONTROL UNIT
3011 RADIO RESOURCE CONTROL UNIT
3013 SUBFRAME SETTING UNIT
3015 SCHEDULING UNIT
3017 CSI REPORT CONTROL UNIT

The invention claimed is:

1. A terminal device comprising:
a measurement circuit configured to and/or programmed to, for a value of a channel quality indicator that is reported in a subframe n, derive an index of the channel quality indicator based on a channel state information reference resource; and
a transmission circuit configured to and/or programmed to report channel state information which comprises the channel quality indicator in the subframe n,
wherein in a time domain, the channel state information reference resource is defined by a subframe $n-n_{CQI\_ref}$,
wherein for periodic reporting of the channel state information, the $n_{CQI\_ref}$ is a smallest value that is equal to or greater than 4, such that the subframe $n-n_{CQI\_ref}$ corresponds to a valid subframe,
wherein the valid subframe satisfies criteria which include at least a criterion (i),
wherein the criterion (i) stipulates that, in a case where multiple cells with different uplink-downlink configurations are aggregated and the terminal device is not capable of simultaneous reception and transmission in the aggregated multiple cells, the valid subframe in a primary cell is a downlink subframe or a special subframe that is indicated by an uplink-downlink configuration for a radio frame for the primary cell, the multiple cells including at least the primary cell and a serving cell,
wherein for each of the multiple cells, in a case where a physical downlink control channel which is used for signaling information that indicates an uplink-downlink configuration for the radio frame is detected, the uplink-downlink configuration for the radio frame is given by the information that indicates the uplink-downlink configuration for the radio frame,
wherein for each of the multiple cells, in a case where the physical downlink control channel which is used for signaling the information that indicates the uplink-downlink configuration for the radio frame is not detected, the uplink-downlink configuration for the radio frame is same as an uplink-downlink configuration that is indicated by a higher layer parameter.

2. The terminal device according to claim 1,
wherein the special subframe in the criterion (i) contains a downlink pilot time slot (DwPTS) field of which length is more than a predefined value.

3. The terminal device according to claim 1,
wherein the criteria includes a criterion (ii), a criterion (iii), a criterion (iv), a criterion (v), and a criterion (vi),
wherein the criterion (ii) stipulates that, for the radio frame for the serving cell, the valid subframe in the serving cell is a subframe that is indicated as the downlink subframe or the special subframe by the uplink-downlink configuration for the radio frame for the serving cell,
wherein the criterion (iii) stipulates that, for transmission modes 1 to 8, the valid subframe in the serving cell is not a multimedia broadcast and multicast service over single frequency network (MBSFN) subframe, wherein the criterion (iv) stipulates that, in a case where a length of a downlink pilot time slot (DwPTS) is equal to or less than a predefined value, the valid subframe in the serving cell does not contain the DwPTS field, wherein the criterion (v) stipulates that the valid subframe in the serving cell does not fall within a measurement gap that is configured for the terminal device, wherein the criterion (vi) stipulates that, for the periodic reporting of the channel state information, in a case where subframe sets relating to the channel state information are configured, the valid subframe in the serving cell is an element of a subframe set that is linked to the periodic reporting of the channel state information.

4. The terminal device according to claim 3,
wherein in a case where the subframe sets relating to the channel state information are configured, the measurement circuit configured to and/or programmed to use an interference measurement resource that is configured within a subframe set that belongs to the channel state information reference resource, in order to derive interference measurement relating to the channel quality indicator that is reported in the subframe n.

5. A wireless communication method of a terminal device, the method comprising:
deriving an index of the channel quality indicator based on a channel state information reference resource, for a value of a channel quality indicator that is reported in a subframe n; and
reporting channel state information which comprises the channel quality indicator in the subframe n,
wherein in a time domain, the channel state information reference resource is defined by a subframe $n-n_{CQI\_ref}$,
wherein for periodic reporting of the channel state information, the $n_{CQI\_ref}$ is a smallest value that is equal to or greater than 4, such that the subframe $n-n_{CQI\_ref}$ corresponds to a valid subframe,
wherein the valid subframe satisfies criteria which include at least a criterion (i),
wherein the criterion (i) stipulates that, in a case where multiple cells with different uplink-downlink configurations are aggregated and the terminal device is not capable of simultaneous reception and transmission in the aggregated multiple cells, the valid subframe in a primary cell is a downlink subframe or a special subframe that is indicated by an uplink-downlink configuration for a radio frame for the primary cell, the multiple cells including at least the primary cell and a serving cell,
wherein for each of the multiple cells, in a case where the physical downlink control channel which is used for signaling information that indicates an uplink-downlink configuration for the radio frame is detected, the uplink-downlink configuration for the radio frame is given by the information that indicates the uplink-downlink configuration for the radio frame,
wherein for each of the multiple cells, in a case where the physical downlink control channel which is used for signaling the information that indicates the uplink-downlink configuration for the radio frame is not detected, the uplink-downlink configuration for the radio frame is same as an uplink-downlink configuration that is indicated by a higher layer parameter.

6. The wireless communication method according to claim 5,
wherein the special subframe in the criterion (i) contains a downlink pilot time slot (DwPTS) field of which length is more than a predefined value.

7. The wireless communication method according to claim 5,
wherein the reference includes a criterion (ii), a criterion (iii), a criterion (iv), a reference (v), and a criterion (vi),
wherein the criterion (ii) stipulates that, for the radio frame for the serving cell, the valid subframe in the serving cell is a subframe that is indicated, as the downlink subframe or the special subframe, by the uplink-downlink configuration for the radio frame for the serving cell,
wherein the criterion (iii) stipulates that, for transmission modes 1 to 8, the valid subframe in the serving cell is not a multimedia broadcast and multicast service over single frequency network (MBSFN) subframe,
wherein the criterion (iv) stipulates that, in a case where a length of a downlink pilot time slot (DwPTS) is equal to or less than a predefined value, the valid subframe does not contain the DwPTS field,
wherein the criterion (v) stipulates that the valid subframe in the serving cell does not fall within a measurement gap that is configured for the terminal device,
wherein the criterion (vi) stipulates that, for the periodic reporting of the channel state information, in a case where subframe sets relating to the channel state information are configured, the valid subframe in the serving cell is an element of a subframe set that is linked to the periodic reporting of the channel state information.

8. The wireless communication method according to claim 7,
wherein in a case where the subframe sets relating to the channel state information are configured, an interference measurement resource that is configured within a subframe set that belongs to the channel state information reference resource is used in order to derive interference measurement relating to the channel quality indicator that is reported in the subframe n.

9. An integrated circuit incorporated in a terminal device, comprising:
a measurement circuit configured to and/or programmed to derive an index of the channel quality indicator based on a channel state information reference resource, for a value of a channel quality indicator that is reported in a subframe n; and
a transmission circuit configured to and/or programmed to report channel state information which comprises the channel quality indicator in the subframe n,
wherein in a time domain, the channel state information reference resource is defined by a subframe $n-n_{CQI\_ref}$,
wherein for periodic reporting of the channel state information, the $n_{CQI\_ref}$ is a smallest value that is equal to or greater than 4, such that the subframe $n-n_{CQI\_ref}$ corresponds to a valid subframe,
wherein the valid subframe satisfies criteria which include at least a criterion (i),
wherein the criterion (i) stipulates that, in a case where multiple cells with different uplink-downlink configurations are aggregated and the terminal device is not capable of simultaneous reception and transmission in the aggregated multiple cells, the valid subframe in a primary cell is a downlink subframe or a special subframe that is indicated by an uplink-downlink configuration for a radio frame for the primary cell, the multiple cells including at least the primary cell and a serving cell, wherein for each of the multiple cells, in a case where the physical downlink control channel which is used for signaling information that indicates an uplink-downlink configuration for the radio frame is detected, the uplink-downlink configuration for the radio frame is given by the information that indicates the uplink-downlink configuration for the radio frame, wherein for each of the multiple cells, in a case where the physical downlink control channel which is used for signaling the information that indicates the uplink-downlink configuration for the radio frame for the cell is not detected, the uplink-downlink configuration for the radio frame for the cell is same as an uplink-downlink configuration that is indicated by a higher layer parameter.

10. The integrated circuit according to claim 9 wherein the special subframe in the criterion (i) contains a downlink pilot time slot (DwPTS) field of which length is more than a predefined value.

11. The integrated circuit according to claim 9, wherein the criteria includes a criterion (ii), a criterion (iii), a criterion (iv), a criterion (v), and a criterion (vi), wherein the criterion (ii) stipulates that, for the radio frame for the serving cell, the valid subframe in the serving cell is a subframe that is indicated, as the downlink subframe or the special subframe, by the uplink-downlink configuration for the radio frame for the serving cell, wherein the criterion (iii) stipulates that, for transmission modes 1 to 8, the valid subframe in the serving cell is not a multimedia broadcast and multicast service over single frequency network (MBSFN) subframe, wherein the criterion (iv) stipulates that, in a case where a length of a downlink pilot time slot (DwPTS) is equal to or less than a predefined value, the valid subframe does not contain the DwPTS field, wherein the criterion (v) stipulates that the valid subframe in the serving cell does not fall within a measurement gap that is configured for the terminal device, wherein the criterion (vi) stipulates that, for the periodic reporting of the channel state information, in a case where subframe sets relating to the channel state information are configured, the valid subframe in the serving cell is an element of a subframe set that is linked to the periodic reporting of the channel state information.

12. The integrated circuit according to claim 11, wherein in a case where the subframe sets relating to the channel state information are configured, the measurement circuit configured to and/or programmed to use an interference measurement resource that is configured within a subframe set that belongs to the channel state information reference resource in order to derive interference measurement relating to the channel quality indicator that is reported in the subframe n.

* * * * *